(12) United States Patent
Viele

(10) Patent No.: US 8,214,133 B2
(45) Date of Patent: Jul. 3, 2012

(54) APPARATUS AND METHOD FOR USE IN COMPUTATIONAL FLUID DYNAMICS

(75) Inventor: Matthew Viele, Fort Collins, CO (US)

(73) Assignee: Colorado State University Research Foundation, Fort Collins, CO (US)

( * ) Notice: Subject to any disclaimer, the term of this patent is extended or adjusted under 35 U.S.C. 154(b) by 0 days.

(21) Appl. No.: 13/195,464

(22) Filed: Aug. 1, 2011

(65) Prior Publication Data

US 2012/0016564 A1 Jan. 19, 2012

Related U.S. Application Data

(62) Division of application No. 11/729,676, filed on Mar. 29, 2007, now Pat. No. 7,991,488.

(51) Int. Cl.
*G06F 19/00* (2011.01)
*F02D 41/30* (2006.01)
*F02D 41/04* (2006.01)

(52) U.S. Cl. ............... 701/106; 701/104; 701/115

(58) Field of Classification Search ............ 123/435, 123/456, 472, 478, 480, 486, 488; 701/101–106, 701/110, 111, 114, 115; 60/274, 276, 285; 73/114.43; 702/182, 183, 187–189
See application file for complete search history.

(56) References Cited

U.S. PATENT DOCUMENTS

| 4,197,767 A | 4/1980 | Leung |
| 4,845,464 A | 7/1989 | Drori et al. |
| 5,349,933 A | 9/1994 | Hasegawa et al. |
| 5,774,693 A | 6/1998 | Hsu et al. |
| 5,778,439 A | 7/1998 | Trimberger et al. |
| 6,564,543 B1 | 5/2003 | Orzel et al. |
| 6,925,373 B2 * | 8/2005 | La Rosa et al. ............. 60/274 |
| 7,143,580 B2 * | 12/2006 | Ge ............................. 60/605.1 |
| 7,171,950 B2 * | 2/2007 | Palma et al. ................ 123/435 |
| 7,181,336 B2 | 2/2007 | Muto et al. |
| 7,437,874 B2 * | 10/2008 | Ramamurthy et al. ...... 701/110 |
| 7,668,704 B2 | 2/2010 | Perchanok et al. |

(Continued)

FOREIGN PATENT DOCUMENTS

EP 1424480 6/2004

(Continued)

OTHER PUBLICATIONS

"Hardware-in-The-Loop", Precision MBA, 2005, 5 pages.

(Continued)

*Primary Examiner* — Willis Wolfe, Jr.
(74) *Attorney, Agent, or Firm* — Meyertons Hood Kivlin Kowert & Goetzel, P.C.; Jeffrey C. Hood

(57) ABSTRACT

An apparatus includes a parallel computation unit including an input port and an output port and a one-dimensional computational fluid dynamics model. The input port is configured to sample at a time t1 a boundary condition signal for the one-dimensional computational fluid dynamics model and the output port is configured to provide an output signal before the boundary condition signal is sampled at a time t2.

48 Claims, 25 Drawing Sheets

U.S. PATENT DOCUMENTS

| | | |
|---|---|---|
| 7,676,318 B2 * | 3/2010 | Allain .......................... 701/103 |
| 7,991,488 B2 * | 8/2011 | Viele ............................ 701/114 |
| 2004/0134268 A1 | 7/2004 | Tuken et al. |
| 2004/0164690 A1 | 8/2004 | Degner et al. |
| 2004/0211171 A1 | 10/2004 | Nakagawa et al. |
| 2004/0218062 A1 | 11/2004 | Silverstein et al. |
| 2006/0142930 A1 | 6/2006 | Okubo et al. |
| 2007/0061064 A1 | 3/2007 | Dollmeyer et al. |
| 2007/0088775 A1 | 4/2007 | Asplund et al. |
| 2007/0198240 A1 | 8/2007 | Moriat |
| 2007/0219766 A1 | 9/2007 | Duggleby et al. |
| 2008/0201054 A1 | 8/2008 | Grichnik et al. |
| 2008/0243360 A1 | 10/2008 | Spivak |

FOREIGN PATENT DOCUMENTS

| | | |
|---|---|---|
| JP | 8-74646 | 3/1996 |
| JP | 2001-4414 | 1/2001 |
| JP | 2007-164437 | 6/2007 |

OTHER PUBLICATIONS

John B. Heywood, "Internal Combustion Engine Fundamentals," 1989, pp. 755-759.

* cited by examiner

APPARATUS AND METHOD FOR USE IN COMPUTATIONAL FLUID DYNAMICS

CONTINUATION DATA

This application is a divisional of U.S. application Ser. No. 11/729,676, titled "Apparatus and Method for Use in Computational Fluid Dynamics", filed Mar. 29, 2007, now U.S. Pat. No. 7,991,488, whose inventor was Matthew Viele, and which is incorporated herein by reference in its entirety as though fully and completely set forth herein.

FIELD

The subject matter of the disclosure relates to computational fluid dynamics and, more particularly, to real time computational fluid dynamics.

BACKGROUND

Computational fluid dynamics uses mathematical methods to solve problems that include fluid flow. An exemplary problem in the field of computational fluid dynamics is the problem of predicting the pressure at any point along a fuel rail of an operating diesel engine as a function of time. A real time solution to this problem would enable the design and manufacture of improved engines. These improved engines would provide higher performance and lower pollution levels than engines available today. At this time, predictions of the real time operation of engines are obtained by running simulations using computational fluid dynamics models on a supercomputer or workstation. Unfortunately, the predictions that result from such simulations require hours of supercomputer time to predict a few seconds of engine operation. They are not performed in real time. Finally, when these predictions are incorporated in a real time engine control system they do not yield the desired results.

BRIEF DESCRIPTION OF THE DRAWINGS

The disclosed embodiments may be understood with reference to the following drawings, in which like elements are indicated by like numbers. These drawings are provided to illustrate selected embodiments of the disclosure and are not intended to limit the scope of the claims.

DESCRIPTION

The following discussion sets forth numerous specific details to provide a thorough understanding of the disclosure. However, those of ordinary skill in the art, having the benefit of this disclosure, will appreciate that the subject matter of the disclosure may be practiced without these specific details. In addition, various well-known methods, procedures, components, software, and circuits have not been described in detail in order to focus attention on the features disclosed.

Figure 1A:
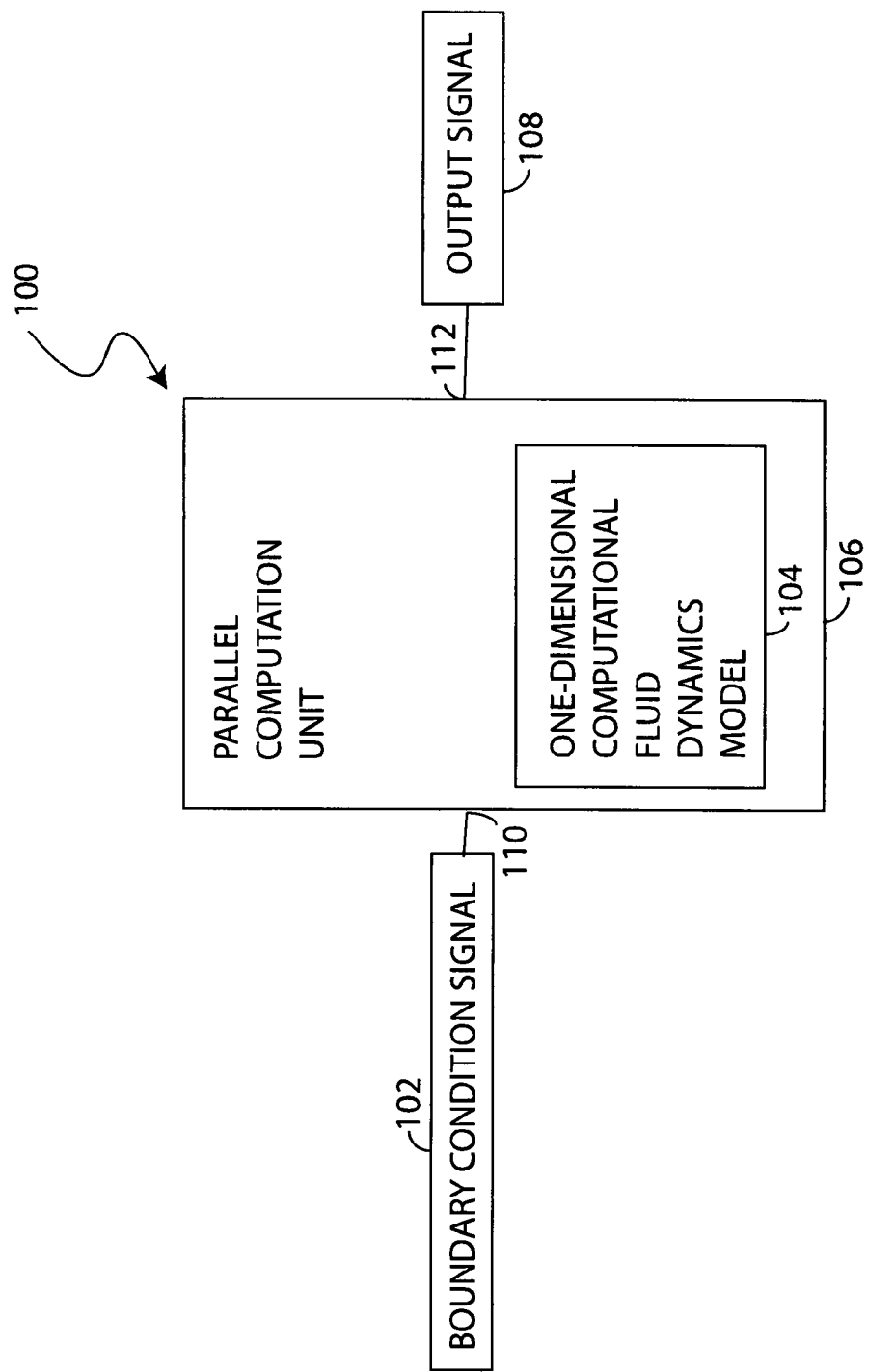
FIG. 1A shows a block diagram of an apparatus including a boundary condition signal for a one-dimensional computational fluid dynamics model and a parallel computation unit to receive the boundary condition signal and provide an output signal in accordance with some embodiments.

FIG. 1A shows a block diagram of an apparatus 100 including a boundary condition signal 102 for a one-dimensional computational fluid dynamics model 104 and a parallel computation unit 106 to receive the boundary condition signal 102 and provide an output signal 108 in accordance with some embodiments. The parallel computation unit 106 includes an input port 110 and an output port 112. The input port 110 receives the boundary condition signal 102. The output port 112 provides the output signal 108.

The boundary condition signal 102 is not limited to a signal representing a particular physical variable. One-dimensional computational fluid dynamics models can be formed to process boundary condition signals for any variable of interest in the system being modeled or any variable that can be derived from the variables included in the system being modeled. One-dimensional computational fluid dynamics models can describe a network of pipes. A network includes any piping intersection configuration. One-dimensional computational fluid dynamics models include linked models, for example, a mechanical check-valve model. Exemplary boundary condition signals processed in computational fluid dynamics engine models include pressure signals, temperature signals, air quality or composition signals, and air/fuel ratio signals. In some embodiments, models convert real world boundary events to boundary conditions. Air quality includes the chemical species and thermodynamic properties included in the air or similar gas. For example, a pressure pulse is generated when an injector is opened.

The one-dimensional computational fluid dynamics model 104 is formed to include in the model the physical variable represented by the boundary condition signal 102 and allow prediction of the value of the variable at a location in the model that is not sampled in the physical system. For example, for a diesel engine fuel rail that includes one pressure sensor to generate a boundary condition pressure signal, the one-dimensional computational fluid dynamics model 104 can process the boundary condition signal 102 for pressure and predict the pressure at any point along the rail in real time.

The computational fluid dynamics model 104 is not limited to using a particular solution method. Exemplary solution methods include finite element, finite volume, finite difference, and spectral methods. In the finite element method, each node is weighted before integration to guarantee continuity. In the finite volume method, the conservation equations are included in integral form and are discretized to a set of algebraic equations that are then solved. In the finite difference method, at each grid point the differential conservation equation is approximated by replacing the partial derivatives by approximations in terms of the nodal values of the functions. In the spectral method, the differential equations are solved using Fourier methods. In some embodiments, a solution method is selected in which the speed of the solution is determined by the Courant number. The Courant number is a parameter used in the stability analysis of finite difference equations such as algebraic equations used to approximate partial differential equations in the computational fluid dynamics model 104.

The parallel computation unit 108 receives the boundary condition signal 102 at the input port 110 and provides the output signal 108 at the output port 112. The output signal 108 is a virtual signal generated through the processing of the boundary condition signal 102 by the parallel processing unit. The output signal 108 is a virtual signal because it is obtained through computation performed in the parallel computation unit 102 rather than through a measurement obtained from the physical system. For example, if the boundary condition signal 102 represents the actual pressure at a first point along a diesel fuel rail, then the output signal 108 is a virtual signal that represents the pressure at an second point along the diesel engine fuel rail that is not measured or sampled.

In operation, the boundary condition signal 102 is sampled or received by the parallel computation unit 106. At a time t1, the parallel computation unit 106 samples or receives at the input port 110 the boundary condition signal 102. The parallel computation unit 106 provides the output signal 108 at the output port 112 before the boundary condition signal 102 is sampled at a time t2. The time t2 occurs after the time t1.

In some embodiments, the difference between the time t2 and the time t1 is between about ten microseconds and about ten milliseconds. A difference between the time t2 and the time t1 of more than about ten milliseconds is too long for real time control of physical systems such as reciprocating engines. A difference between time t2 and t1 of less than about ten microseconds is too short to provide sufficient processing time for the parallel processing unit 106 to generate the output signal 108 in real time for physical systems such as reciprocating engines. In some embodiments, the difference between time t2 and time t1 is slightly less than the Courant number. The Courant number is substantially equal to the speed of sound divided by a volume element in a computational fluid dynamics model.

The apparatus 100 is not limited to use in connection with a particular system or industry. The apparatus 100 can be applied to systems that include intake air flow dynamics, exhaust flow dynamics, exhaust recirculation flow, hydraulic modeling in anti-lock braking systems and steer-by-wire systems, pump/motor control in hydraulic hybrid vehicle systems, biomedical flow systems, petrochemical systems, and heat transfer systems.

Figure 1B:
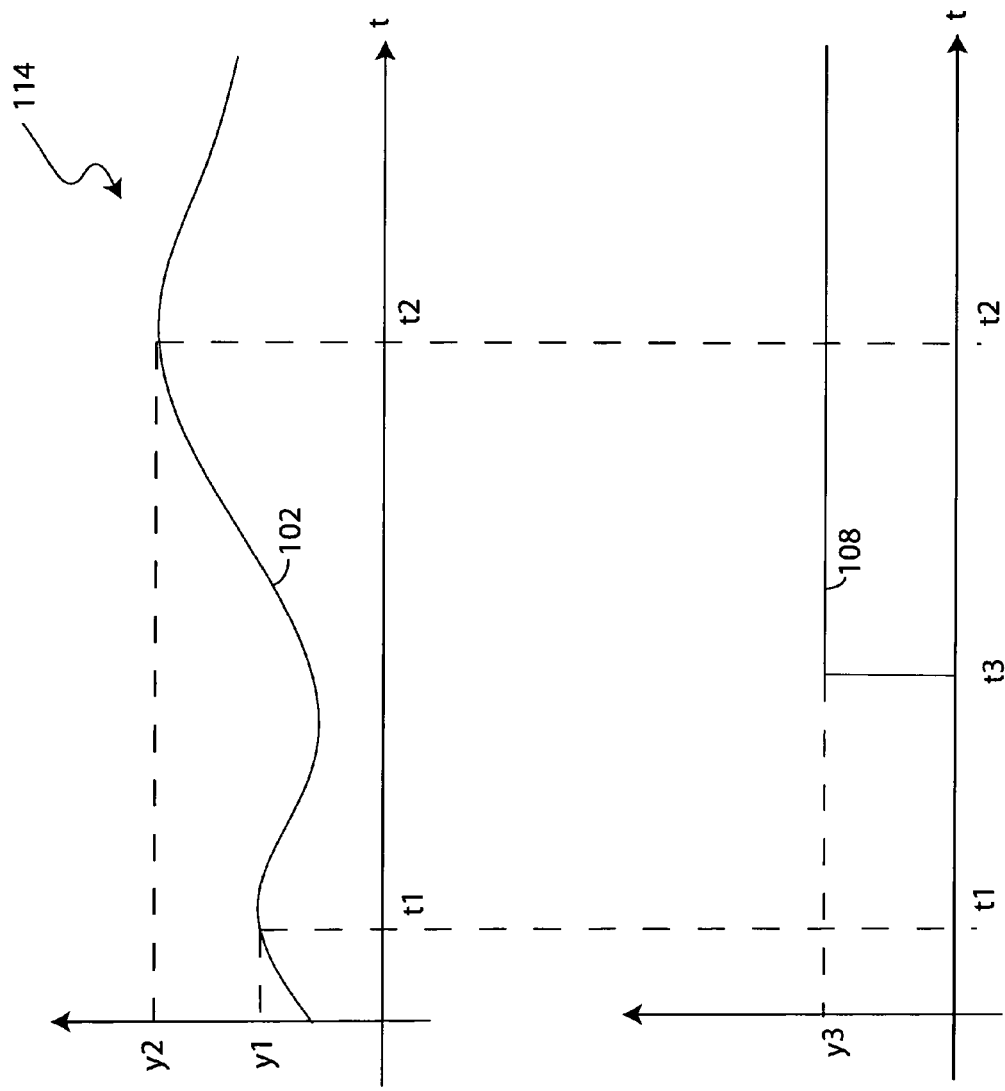
FIG. 1B shows a timing diagram illustrating the relationship between the sampling time t1 and the sampling time t2 of the boundary condition signal shown in FIG. 1A and the output signal shown in FIG. 1A in accordance with some embodiments.

FIG. 1B shows a timing diagram 114 illustrating the relationship between the sampling times t1 and t2 of the boundary condition signal 102 shown in FIG. 1A and the output signal 108 also shown in FIG. 1A in accordance with some embodiments. As shown in FIG. 1B, the boundary condition signal 102 when sampled or received at the time t1 has a value of y1 and when sampled or received at the time t2 has a value of y2. The output signal 108 is provided by the parallel processing unit 106, shown in FIG. 1A, at the output port 112, shown in FIG. 1A, at a time t3 and has a value y3. The time t3 occurs after the time t1 and before the time t2.

Figure 1C:
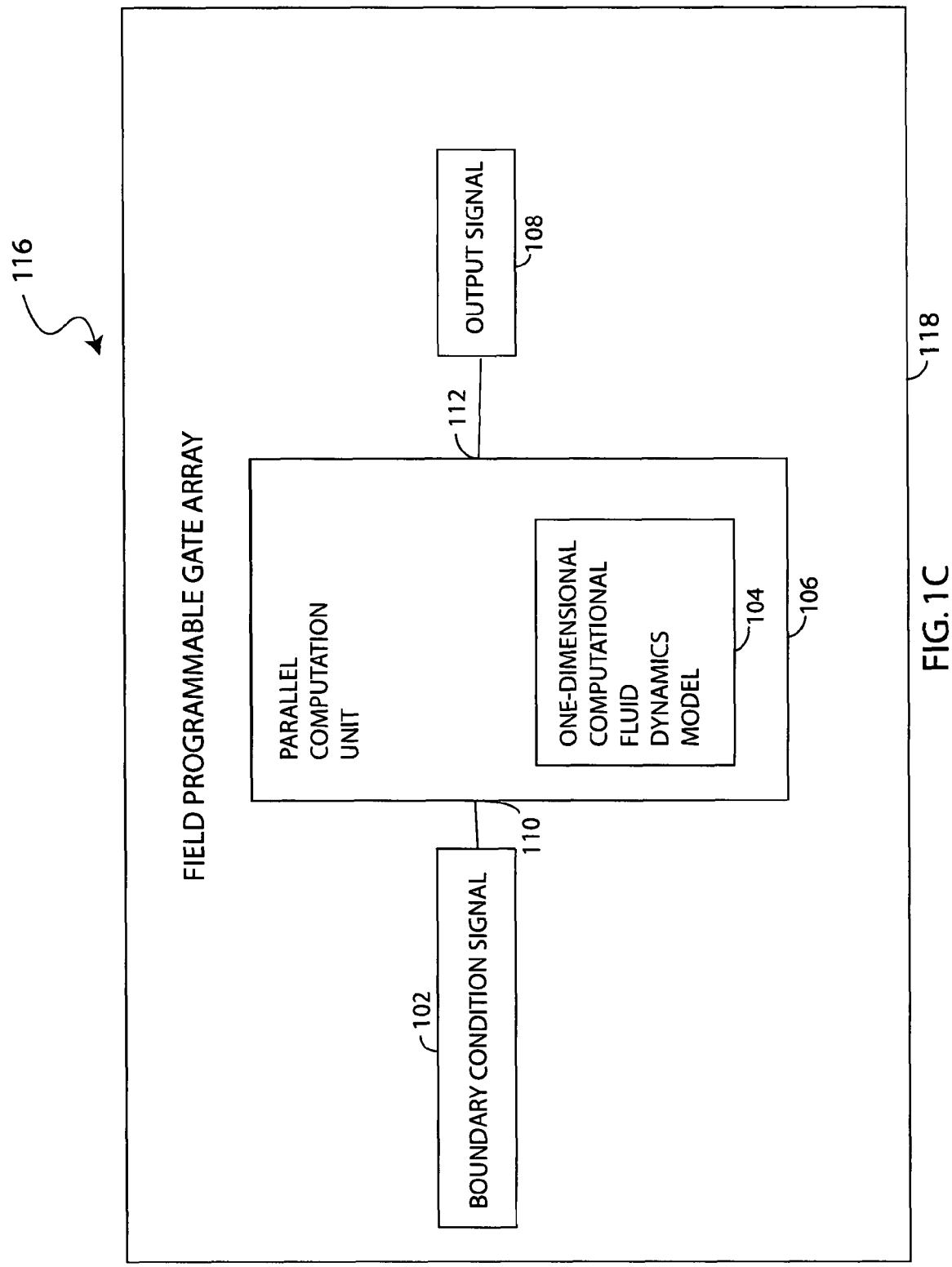
FIG. 1C shows a block diagram of an apparatus including the apparatus of FIG. 1A included in a field programmable gate array in accordance with some embodiments.

FIG. 1C shows a block diagram of an apparatus 116 including the apparatus 100 shown in FIG. 1A included in a field programmable gate array 118 in accordance with some embodiments. A field programmable gate array (FPGA) is an electronic device that includes programmable logic units and programmable interconnects. The programmable logic units can be programmed to provide logic functions, complex combinational functions, and memory functions. Exemplary logic functions provided by FPGAs include AND, OR, XOR, and NOT. Exemplary complex combinational functions provided by FPGAs include decoders and mathematical functions including mathematical functions suitable for use in forming the one-dimensional computational fluid dynamics model 104. Exemplary memory functions include primary and complementary storage as provided by flip-flips and dynamic random access memory circuits. The programmable interconnects can be programmed in a manufacturing environment or in the field after delivery of the product to a customer. Methods of programming interconnects in FPGAs include electrical methods and optical methods. Field programmable gate arrays can be converted to application specific integrated circuits in which the programmability provided by the field programmable gate array has been reduced. Thus, application specific integrated circuits can be substituted for field programmable gate arrays.

Figure 1D:
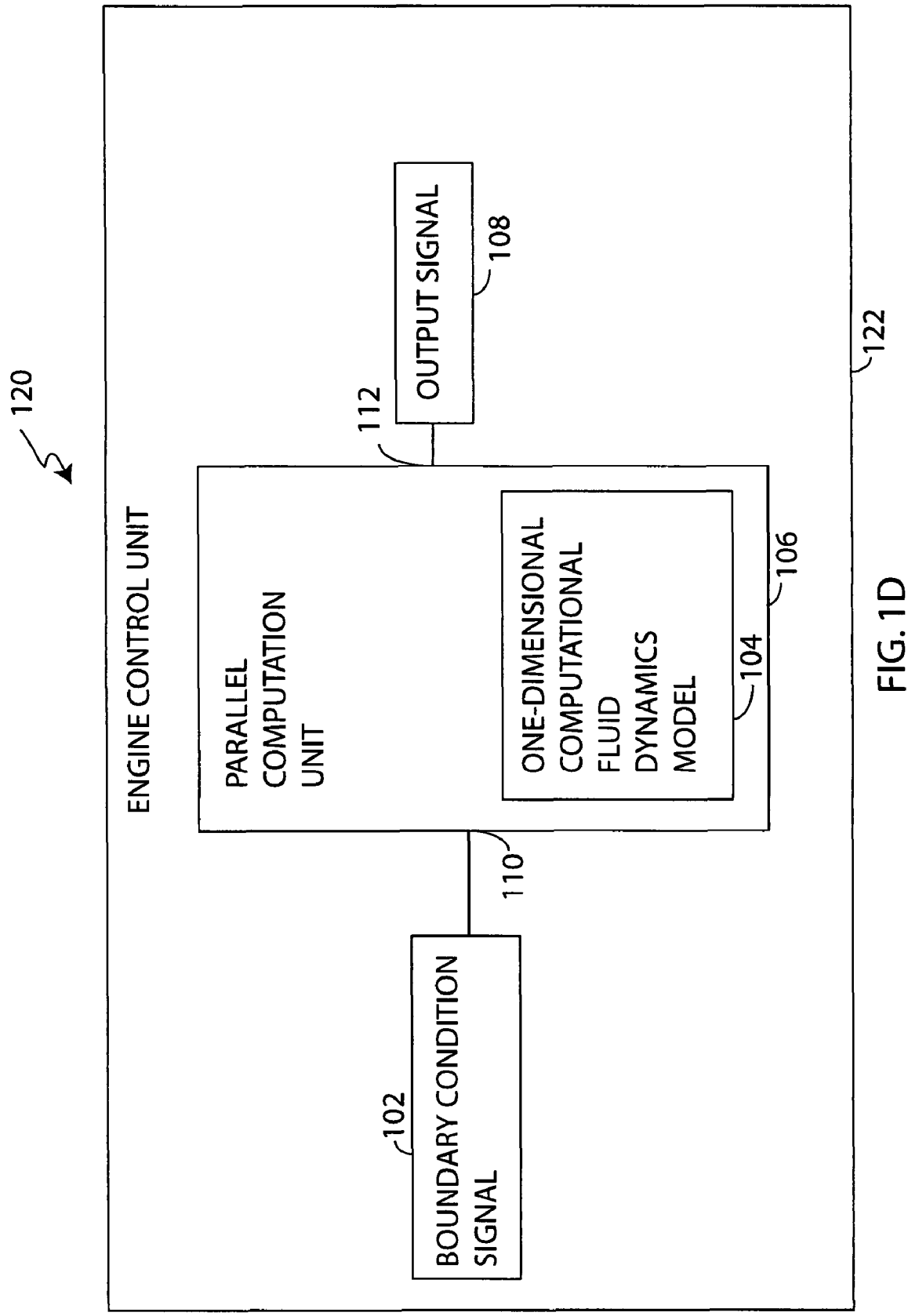
FIG. 1D shows a block diagram of an apparatus including the apparatus of FIG. 1A included in an engine control unit in accordance with some embodiments.

FIG. 1D shows a block diagram of an apparatus 120 including the apparatus 100 shown in FIG. 1A included in an engine control unit 122 in accordance with some embodiments. The engine control unit 122 is configured to send and receive signals to an engine. The engine control unit 122 is not limited to a control unit for controlling a particular type of engine. Exemplary engines suitable for control by the control unit 122 include diesel engines, gasoline engines, alternative fuel engines, and hybrid engines powered by fossil fuels and renewable fuels. Exemplary alternative fuels include natural gas and biofuels, such as methanol, ethanol, and hydrogen.

The engine control unit 122 is not limited to being formed from a particular type of electronic component. Discrete circuits and integrated circuits, including processors, such as complex instruction set processors and reduced instruction set processors, application specific integrated circuits, and software are components and technologies suitable for use in forming the engine control unit 122.

The engine control unit 122 is not limited to being formed using a particular packaging technology. Exemplary packaging technologies suitable for use in connection with the fabrication of the engine control unit 122 include multi-carrier modules, card or board packages, and encapsulated or hermetically sealed packages. Combinations of packaging technologies can also be used in forming the engine control unit 122. The engine control unit 122 is not limited to a single unitary package. In some embodiments, the engine control unit 122 is a distributed engine control system distributed among a plurality of packages.

Figure 1E:
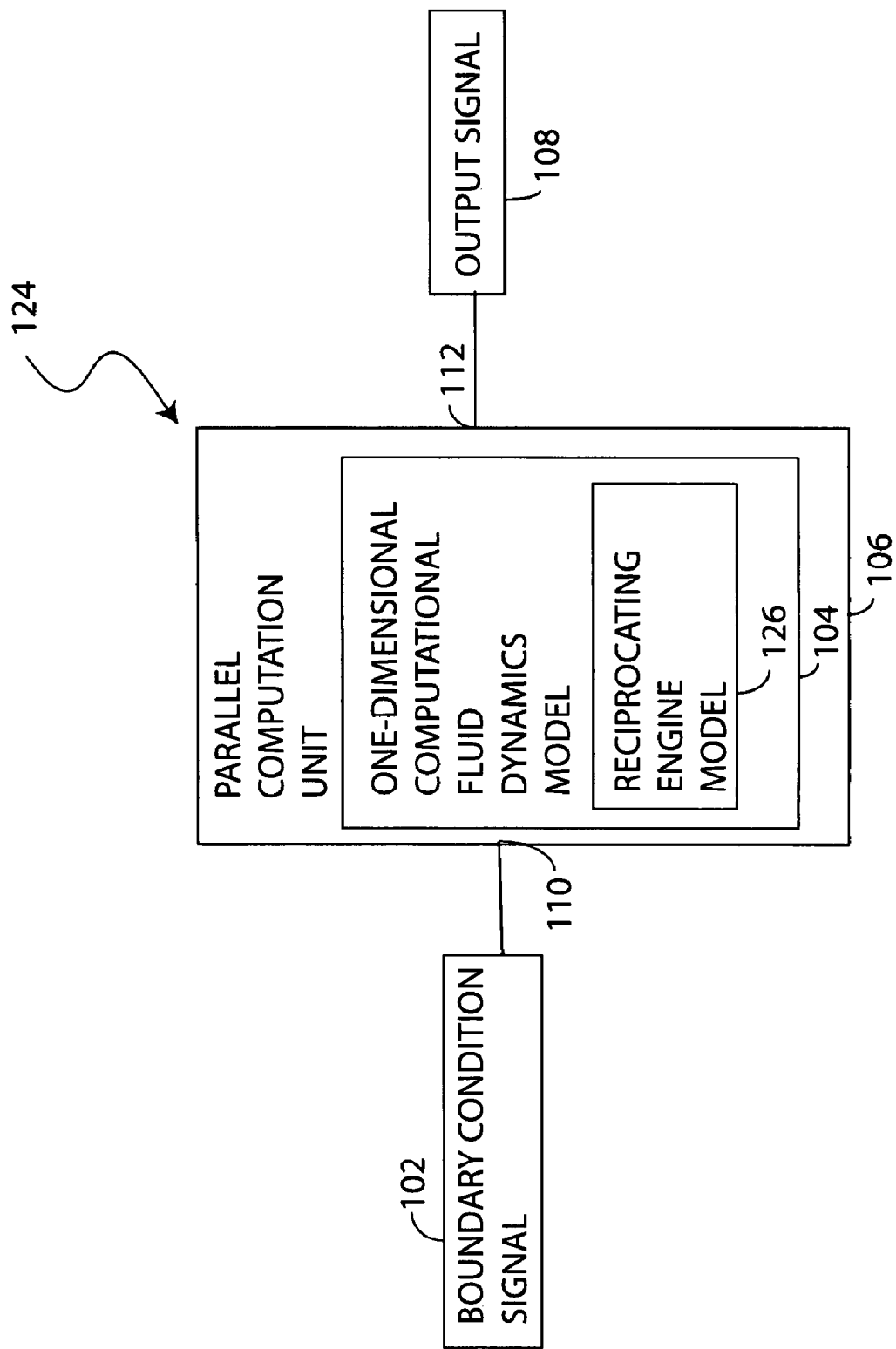
FIG. 1E shows a block diagram of an apparatus including the apparatus of FIG. 1A and including a reciprocating engine model included in the one-dimensional computational fluid dynamics model in accordance with some embodiments.

FIG. 1E shows a block diagram of an apparatus 124 including the apparatus 100 shown in FIG. 1A and including a reciprocating engine model 126 included in the one-dimensional computational fluid dynamics model 104 in accordance with some embodiments. The reciprocating engine model 126 is a model of an engine whose crankshaft is turned by pistons moving up and down in a cylinder.

Figure 2:
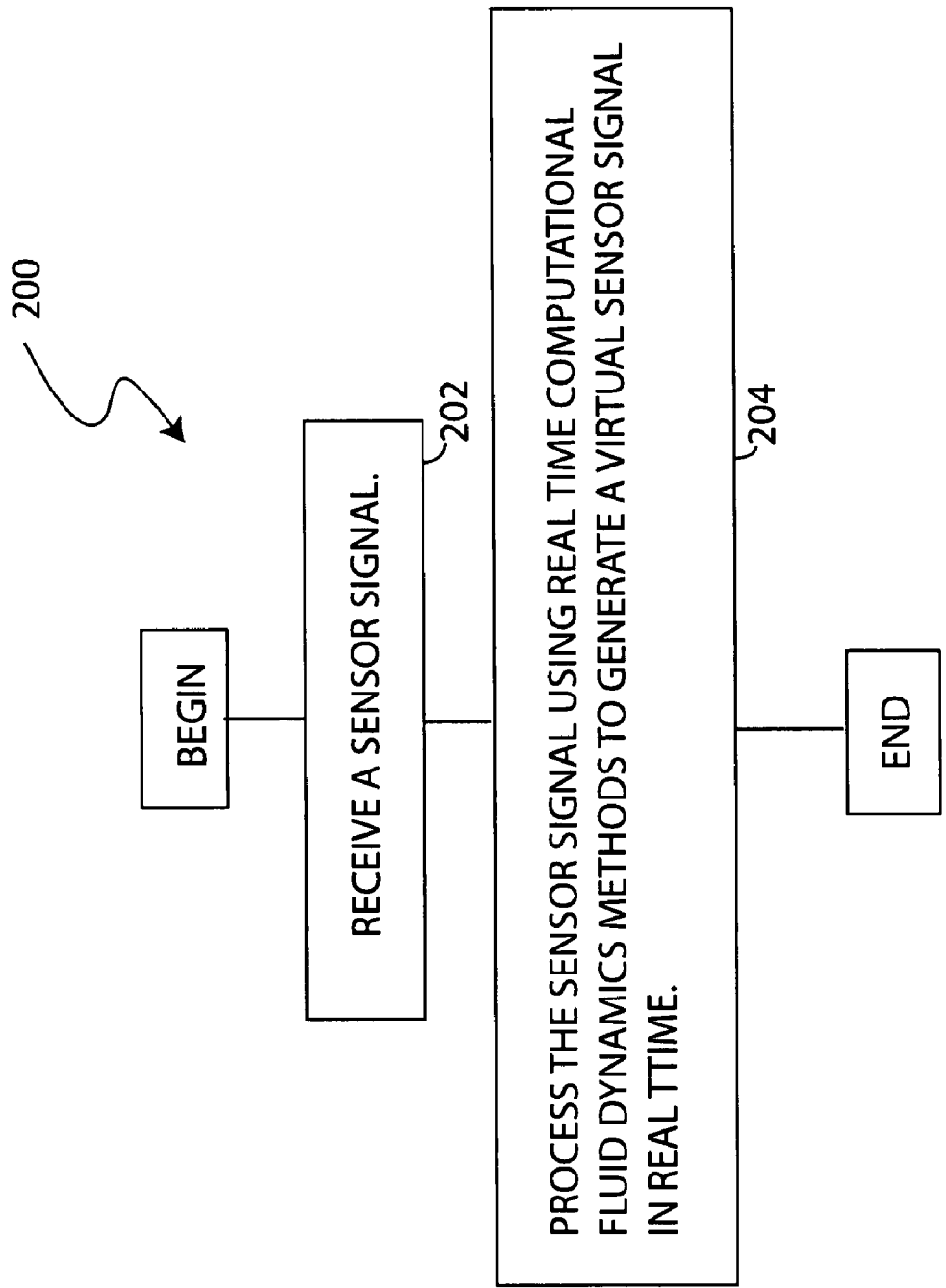
FIG. 2 shows a flow diagram of a method including receiving a sensor signal and processing the sensor signal using real time computational fluid dynamics methods to generate a virtual sensor signal in real time in accordance with some embodiments.

FIG. 2 shows a flow diagram of a method 200 including receiving a sensor signal (block 202) and processing the sensor signal using real time computational fluid dynamics methods to generate a virtual sensor signal in real time (block 204). The sensor signal is provided by a sensor, such as a temperature or pressure sensor, in real time. In some embodiments, the method 200 further includes processing the virtual sensor signal to generate an injector control signal. An injector control signal can control an injector, such as an injector included in a diesel engine. An injector delivers a controlled amount of material, such as diesel fuel, to a process chamber. In some embodiments, processing the sensor signal using computational fluid dynamics methods to generate the virtual sensor signal in real time includes interpolation. Interpolation is the estimation of a numerical value between two given numerical values. The interpolation is not limited to a particular method. Exemplary methods of interpolation include linear interpolation, polynomial interpolation, and spline interpolation.

Figure 3A:
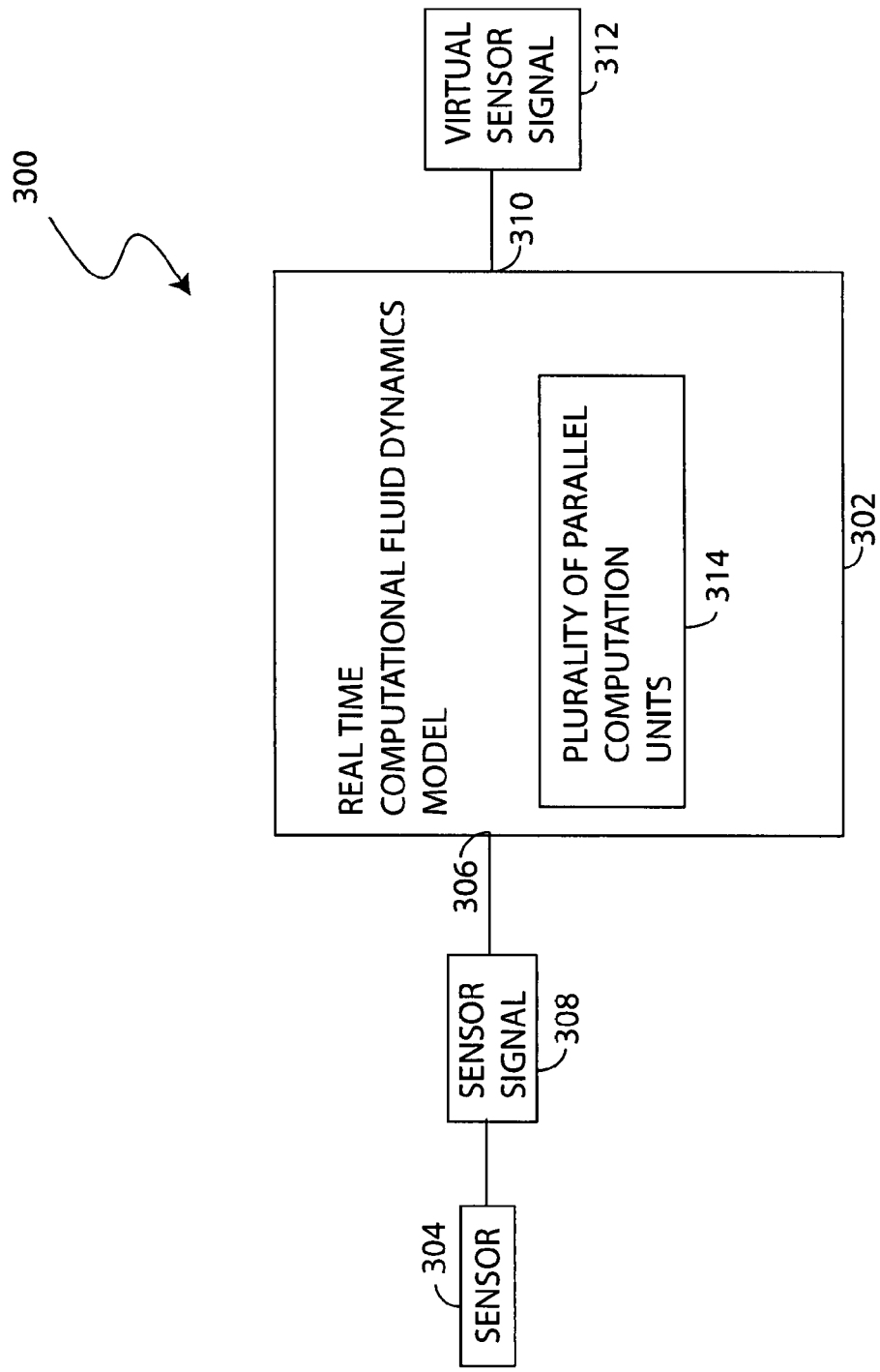
FIG. 3A shows a block diagram of an apparatus including a real time computational fluid dynamics model coupled to a sensor in accordance with some embodiments.

FIG. 3A shows a block diagram of an apparatus 300 including a real time computational fluid dynamics model 302 coupled to a sensor 304 in accordance with some embodiments. The real time computational fluid dynamics model 302 includes an input port 306 to receive the sensor signal 308 and an output port 310 to provide a virtual sensor signal 312 in real time. The real time computational fluid dynamics model 302 includes a plurality of parallel computation units 314 to generate and provide the virtual sensor signal 312. In some embodiments, each of the plurality of parallel computation units 314 includes a logic unit, a memory unit, a math unit, and interconnects. The plurality of parallel computation units 314 are coupled in series at the interconnects. The virtual sensor signal 312 is generated in real time by the computational fluid dynamics model 302.

The sensor 304 provides a real time sensor signal to the real time computational fluid dynamics model 302. The sensor 304 is not limited to a sensor for sensing a particular physical variable. Exemplary sensors suitable for use in connection with the apparatus 300 include pressure, temperature, and chemical sensors. In some embodiments, the sensor 304 is sampled at a rate of between about 100 Hz and about 100 kHz. Sampling at a rate of less than about 100 Hz is too slow to control high performance systems in real time. Sampling at a rate of more than about 100 kHz does not permit processing a virtual sensor model in real time. Sampling includes sampling performed at the real time computational fluid dynamics model or sampling and conversion of an analog sensor signal to a digital signal outside the computational fluid dynamics model.

In some embodiments, the ratio of the plurality of parallel computation units 314 to nodes is low. A node is a computation point in the real time computational fluid dynamics model 302. A low ratio is a ratio close to about one. A low ratio of the plurality of parallel computation units 314 to nodes enables real time calculation of the virtual sensor signal 312. Each of the plurality of parallel computation units 314 computes a new value for the variable of interest for one node in the real time computational fluid dynamics model 302. This method of computation permits generation of the virtual sensor signal 312 in real time.

Figure 3B:
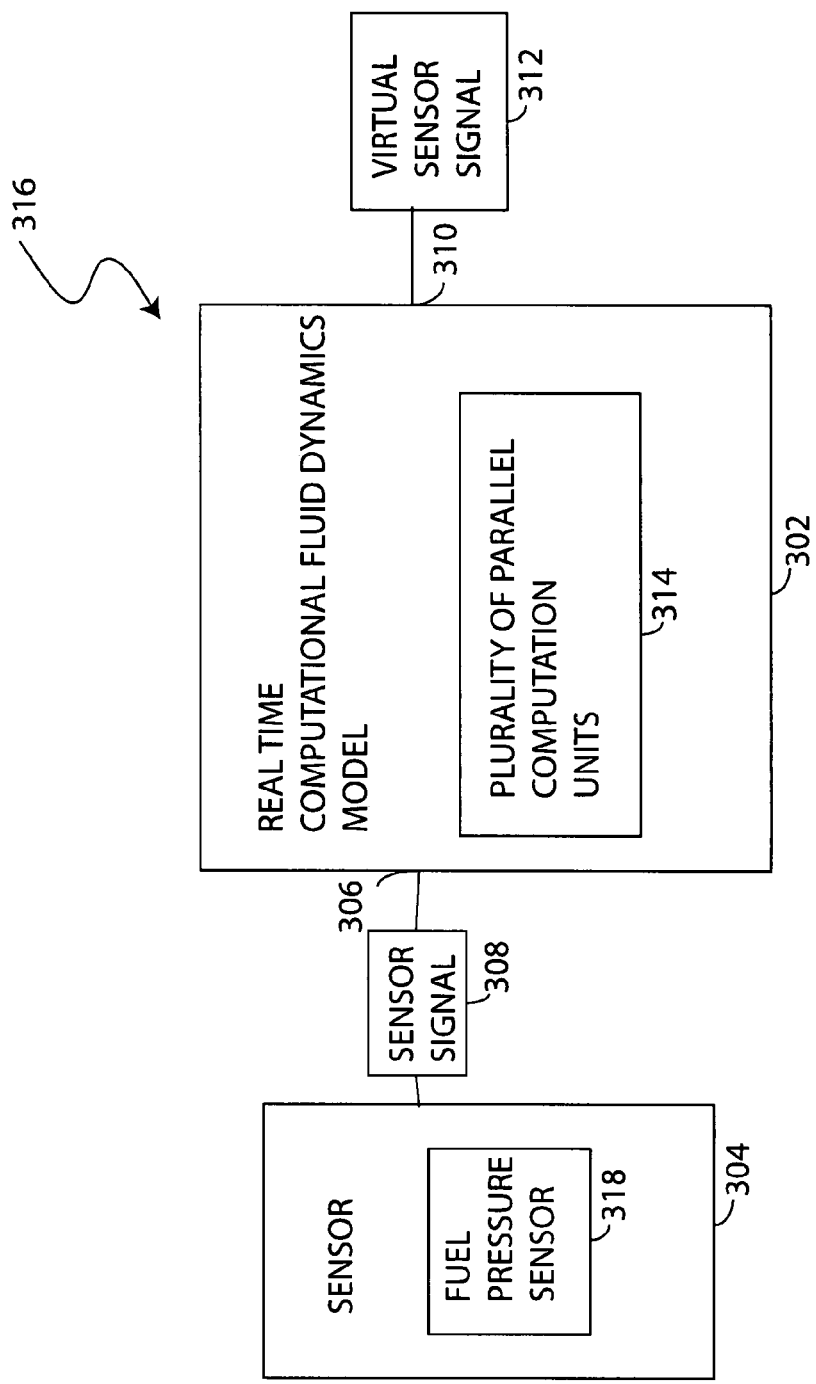
FIG. 3B shows a block diagram of an apparatus including the apparatus shown in FIG. 3A and including a fuel pressure sensor in accordance with some embodiments.

FIG. 3B shows a block diagram of an apparatus 316 including the apparatus 300 of FIG. 3A and a fuel pressure sensor 318 in accordance with some embodiments. The fuel pressure sensor 318 generates a fuel pressure signal that can be virtualized to provide a fuel pressure signal for any point in the combustion chamber. Virtualization includes providing a fuel pressure value for a location not monitored by a fuel pressure sensor.

Figure 3C:
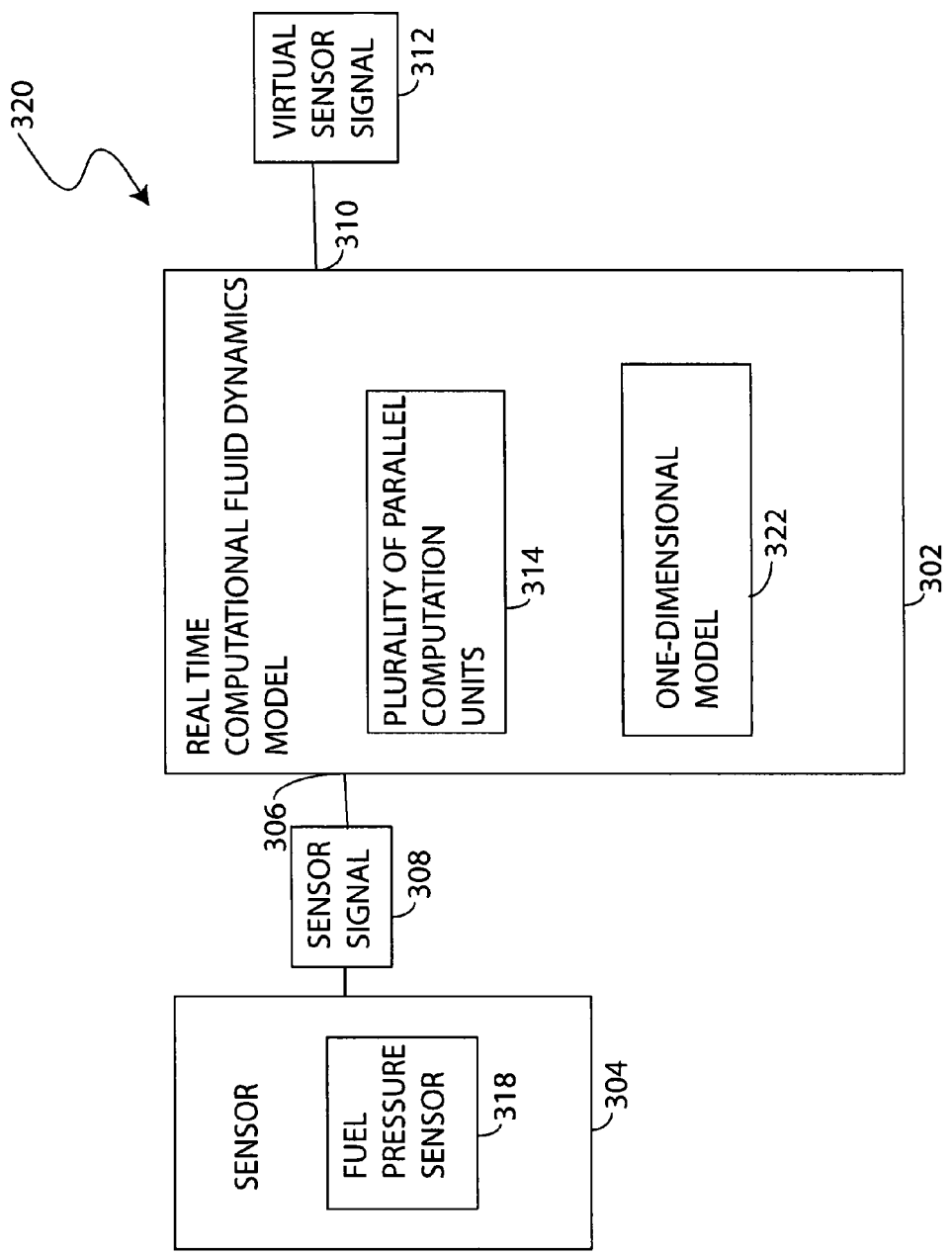
FIG. 3C shows a block diagram of an apparatus including the apparatus shown in FIG. 3A and including a one-dimensional model in accordance with some embodiments.

FIG. 3C shows a block diagram of an apparatus 320 including the apparatus 316 shown in FIG. 3B and including a one-dimensional model 322 in accordance with some embodiments. The one-dimensional model 322 can be modeled as a pipe. The properties of a fluid within the pipe vary only along the direction of the pipe. Real time computational fluid dynamic calculations can be can be performed on the one-dimensional model in real time. For the model, the space in the pipe is divided into many small volumes. The volumes have a known geometry. The fluid, such as a fuel, contained in these volumes has specific properties, such as compressibility, density, and viscosity, for example. Entry and exit conditions, for a fuel rail pipe model, are defined by the engine speed, injection events, and a pressure-regulating valve. Each of these events can be modeled.

Figure 3D:
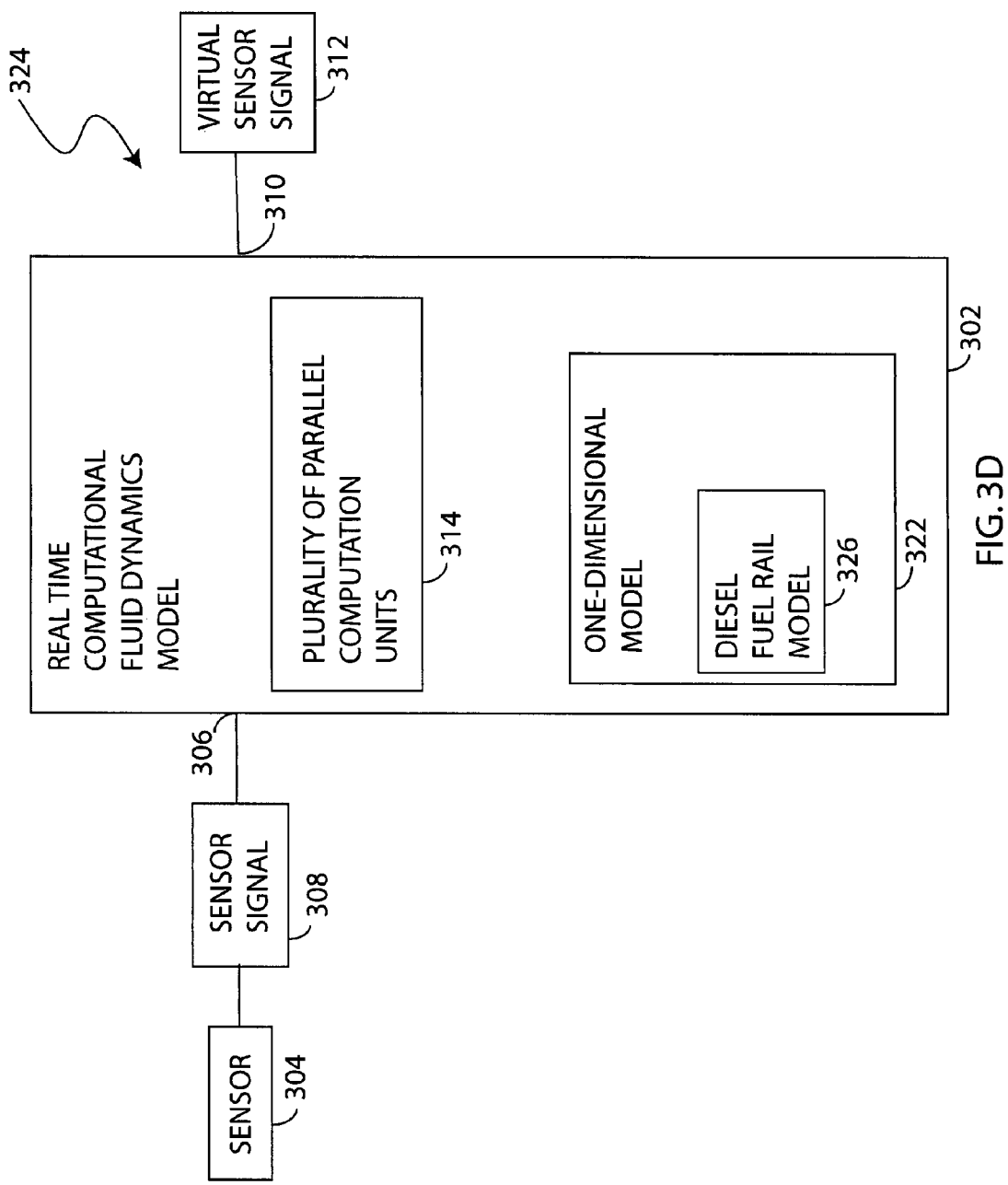
FIG. 3D shows a block diagram of an apparatus including the apparatus shown in FIG. 3C and including a diesel fuel rail model in accordance with some embodiments.

FIG. 3D shows a block diagram of an apparatus 324 including the apparatus 320 shown in FIG. 3C and including a diesel fuel rail model 326 in accordance with some embodiments. In operation, the diesel fuel rail is maintained at high pressure during operation of the engine. Modeling the pressure at each of the injectors along the diesel fuel rail permits precise delivery of fuel which results in improved performance and reduced hydrocarbon emissions.

Figure 4A:
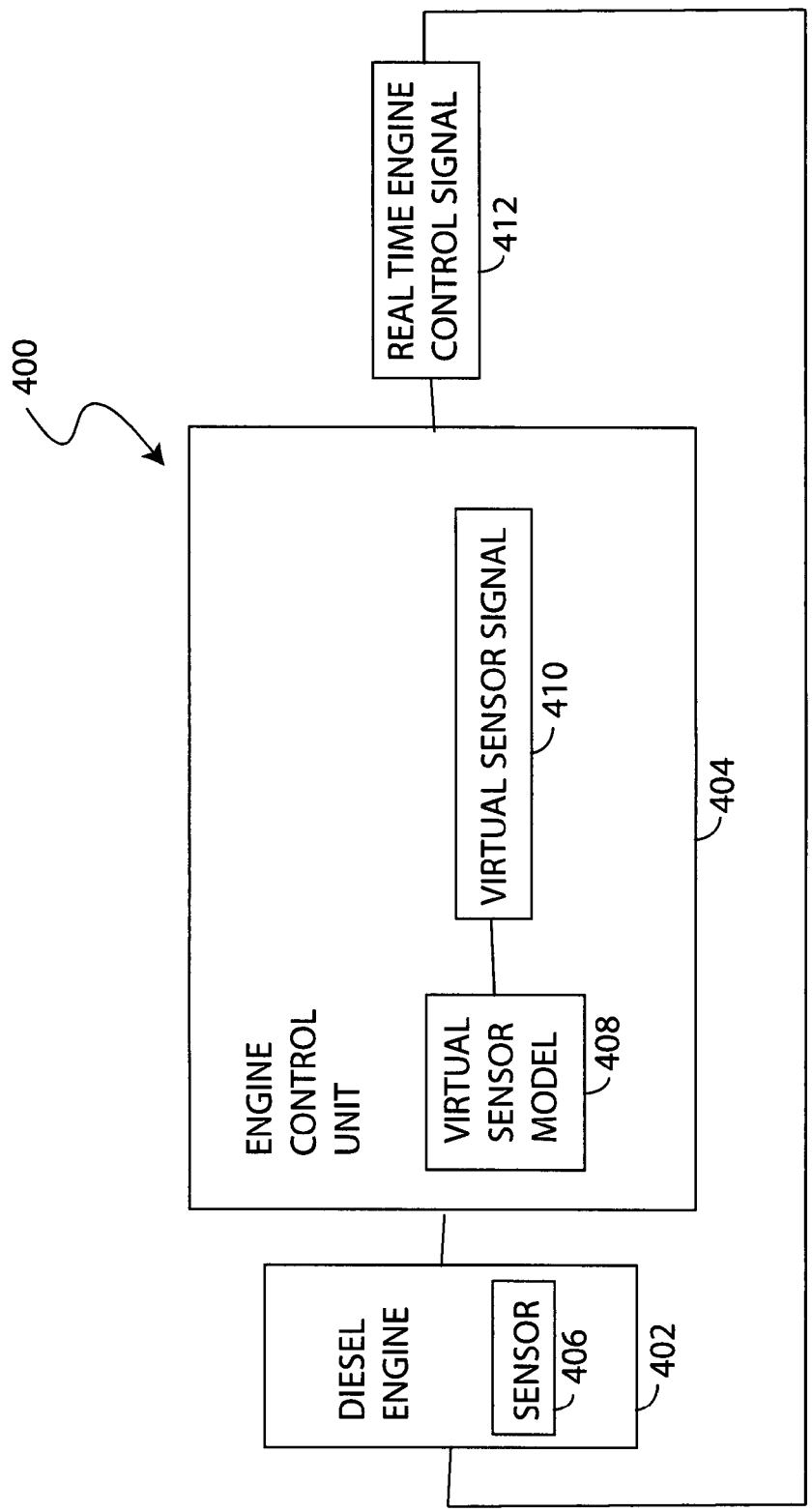
FIG. 4A shows a block diagram of an apparatus including a diesel engine coupled to the engine control unit in accordance with some embodiments.

FIG. 4A shows a block diagram of an apparatus 400 including a diesel engine 402 coupled to an engine control unit 404. The diesel engine 402 is an internal-combustion engine that receives a spray of fuel after the start of the compression stroke and ignites the spray of fuel through the use of the heat of compressed air. The diesel engine 402 includes a sensor 406 to provide a sensor signal to the engine control unit 404. In some embodiments, the sensor 406 includes a pressure sensor. The engine control unit 404 is coupled to the diesel engine 402 and includes a virtual sensor model 408 to receive the sensor signal from the sensor 406. The engine control unit 404 performs a real time computational fluid dynamics calculation to generate a virtual sensor signal 410 for use in forming a real time engine control signal 412 to control the diesel engine 402.

Figure 4B:
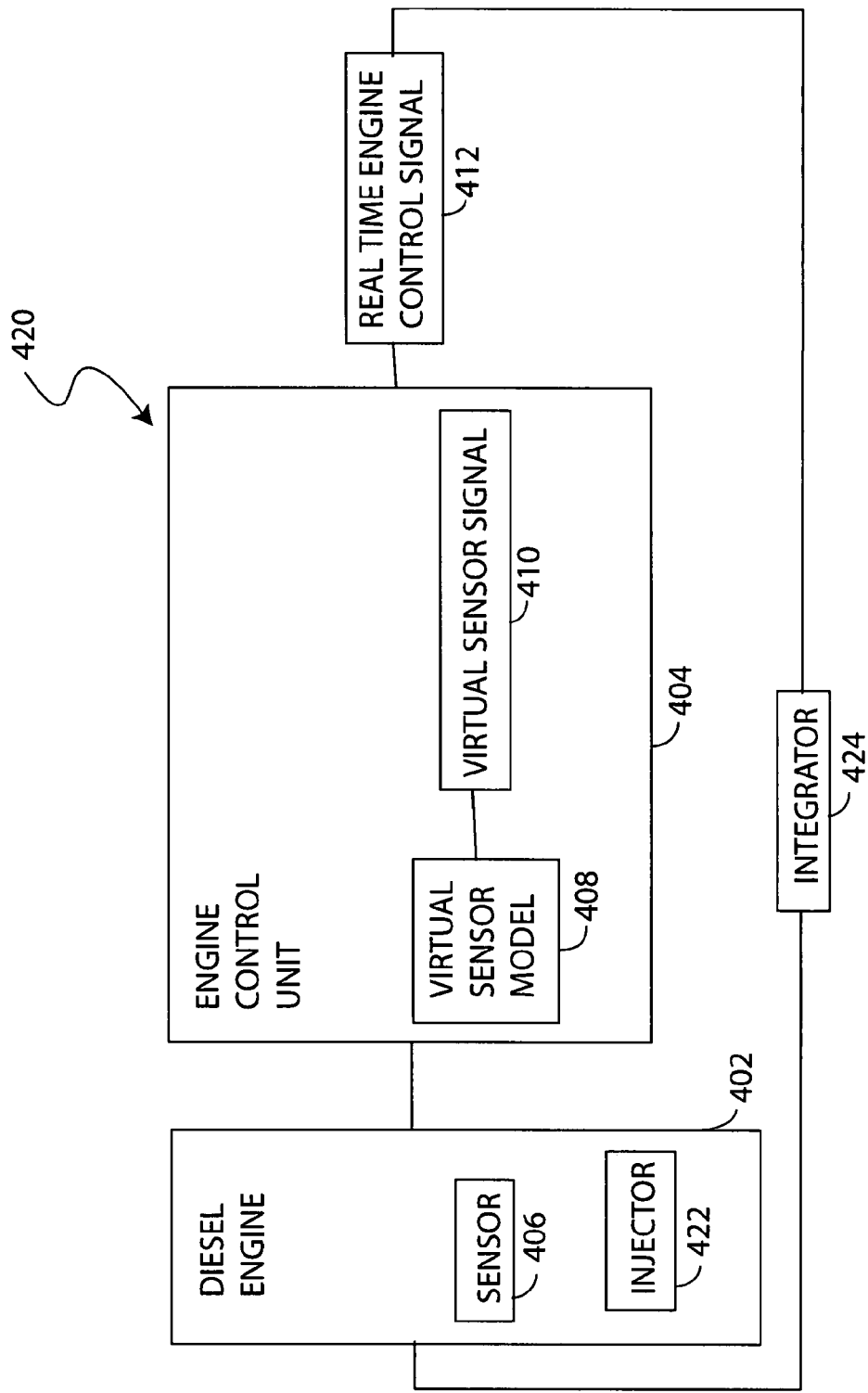
FIG. 4B shows a block diagram of an apparatus including the apparatus shown in FIG. 4A, an injector, and an integrator to process the virtual sensor signal to form the real time control signal for the injector in accordance with some embodiments.

FIG. 4B shows a block diagram of an apparatus 420 including the apparatus 400 shown in FIG. 4A, an injector 422, and an integrator 424 to process the real time control signal 412 or the virtual sensor signal 410 for the injector 422. The injector 422 is a device for metering fuel to a combustion chamber in an engine. The integrator 424 is a device or algorithm that applies the mathematical operation of integration to a signal. For example, in some embodiments, the integrator 424 integrates the virtual sensor signal 410 or the real time control signal 412.

In some embodiments, the pulse width of a control signal delivered to the injector 422 by the integrator 424 is controlled by integrating the instantaneous fuel delivered until it reaches the desired quantity. An exemplary real time engine control signal 412 includes a signal that represents the instantaneous fuel delivered to the injector 422. The instantaneous fuel delivered is a function of the instantaneous pressure at the injector. Delivered fuel is added each time step until a quantity of fuel is reached. Extrapolation techniques are used to predict the exact shutoff time at a temporal resolution greater than the rate at which the real-time computational fluid dynamics model runs.

Figure 4C:
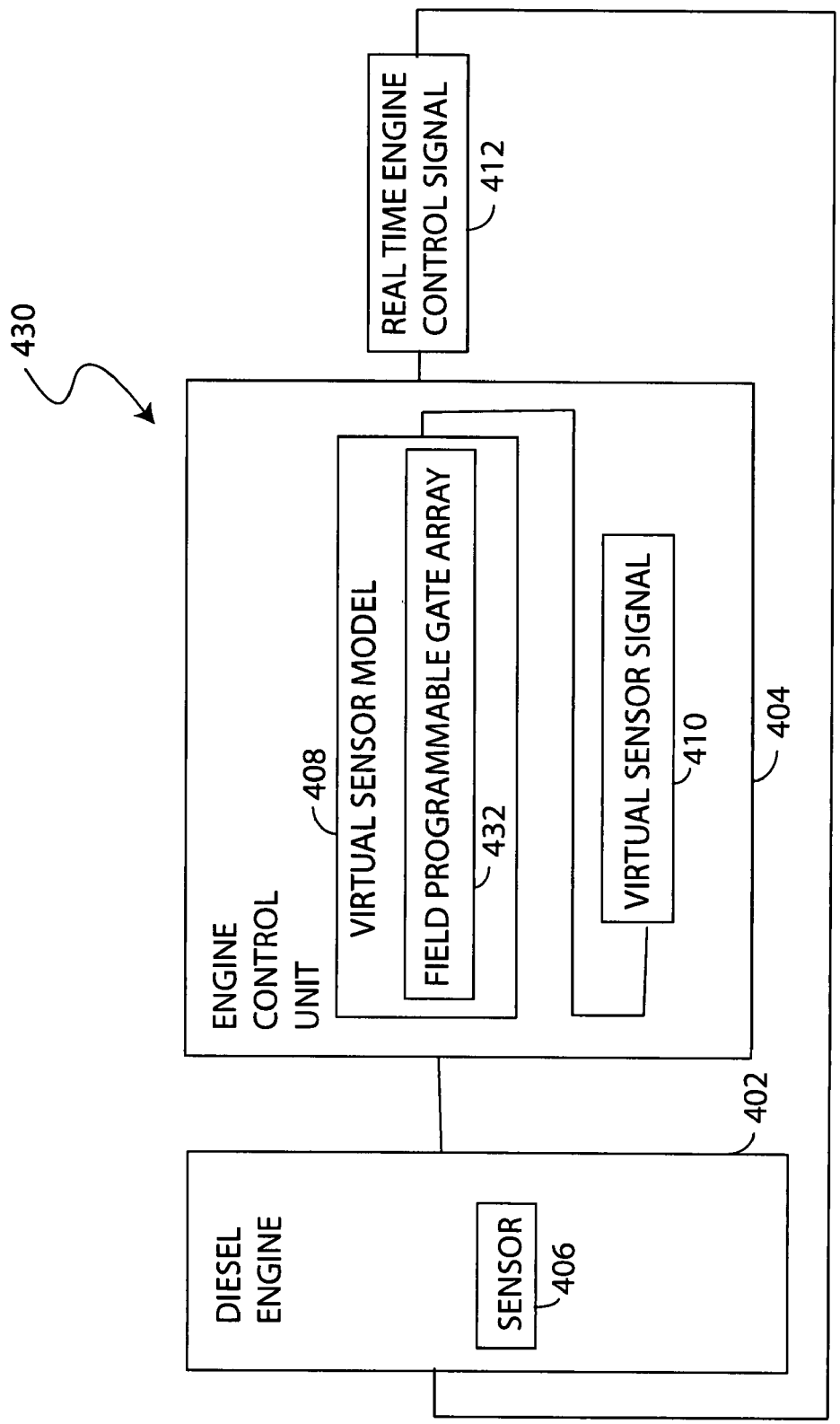
FIG. 4C shows a block diagram of an apparatus including the apparatus shown in FIG. 4A and a field programmable gate array included in the virtual sensor model in accordance with some embodiments.

FIG. 4C shows a block diagram of an apparatus 430 including the apparatus 400 shown in FIG. 4A and a field programmable gate array 432 included in the virtual sensor model 408. The field programmable gate array 432 is a electronic device that includes programmable logic units and programmable interconnects.

Figure 4D:
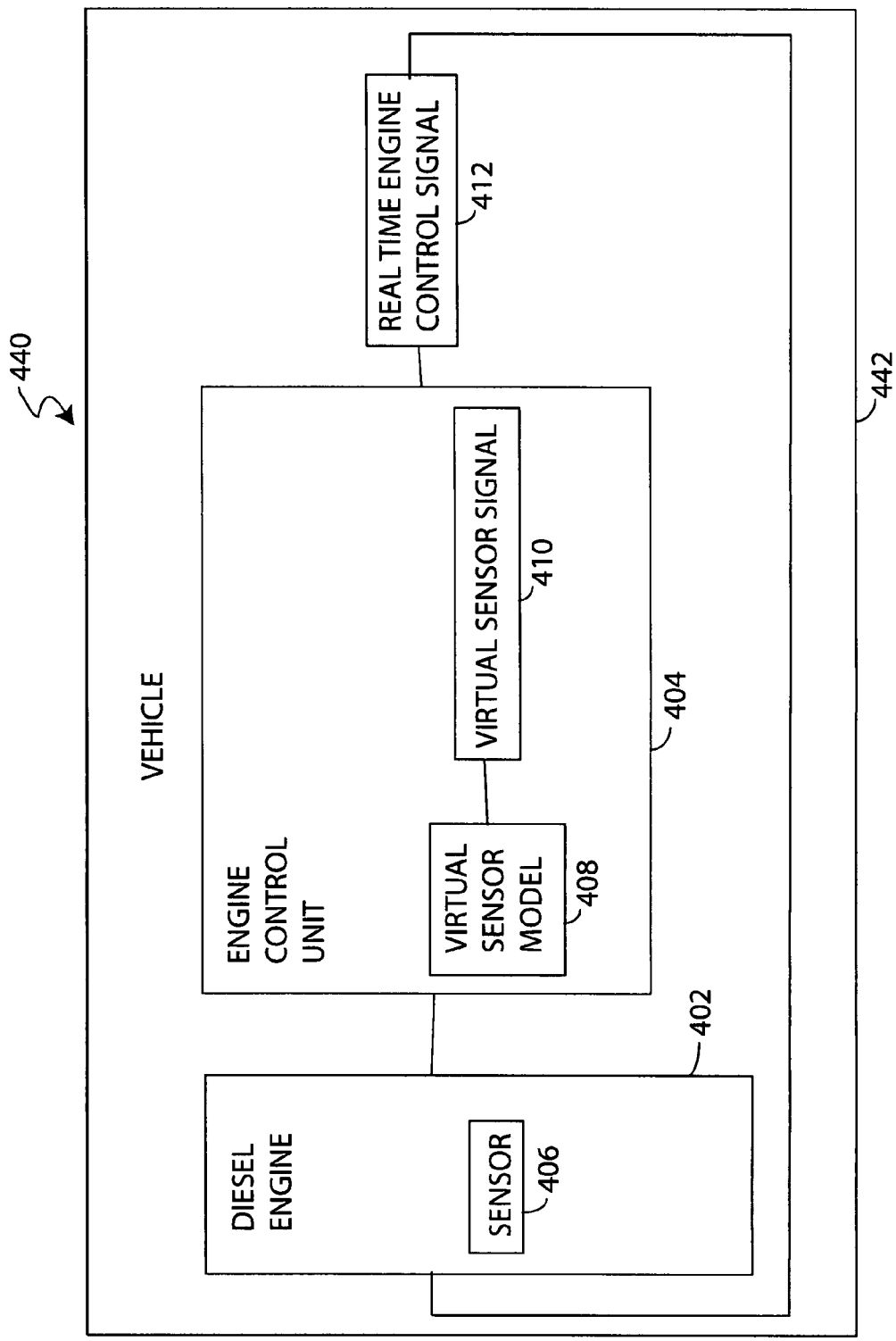
FIG. 4D shows a block diagram of an apparatus including the apparatus shown in FIG. 4A and a vehicle that includes the diesel engine and the engine control unit in accordance with some embodiments.

FIG. 4D shows a block diagram of an apparatus 440 including the apparatus 400 shown in FIG. 4A and a vehicle 442 that includes the diesel engine 402 and the engine control unit 404. The apparatus 440 is not limited to a particular type of vehicle. Exemplary vehicles suitable for use in connection with the apparatus 440 include trucks, cars, trains, planes, and ships.

Figure 5:
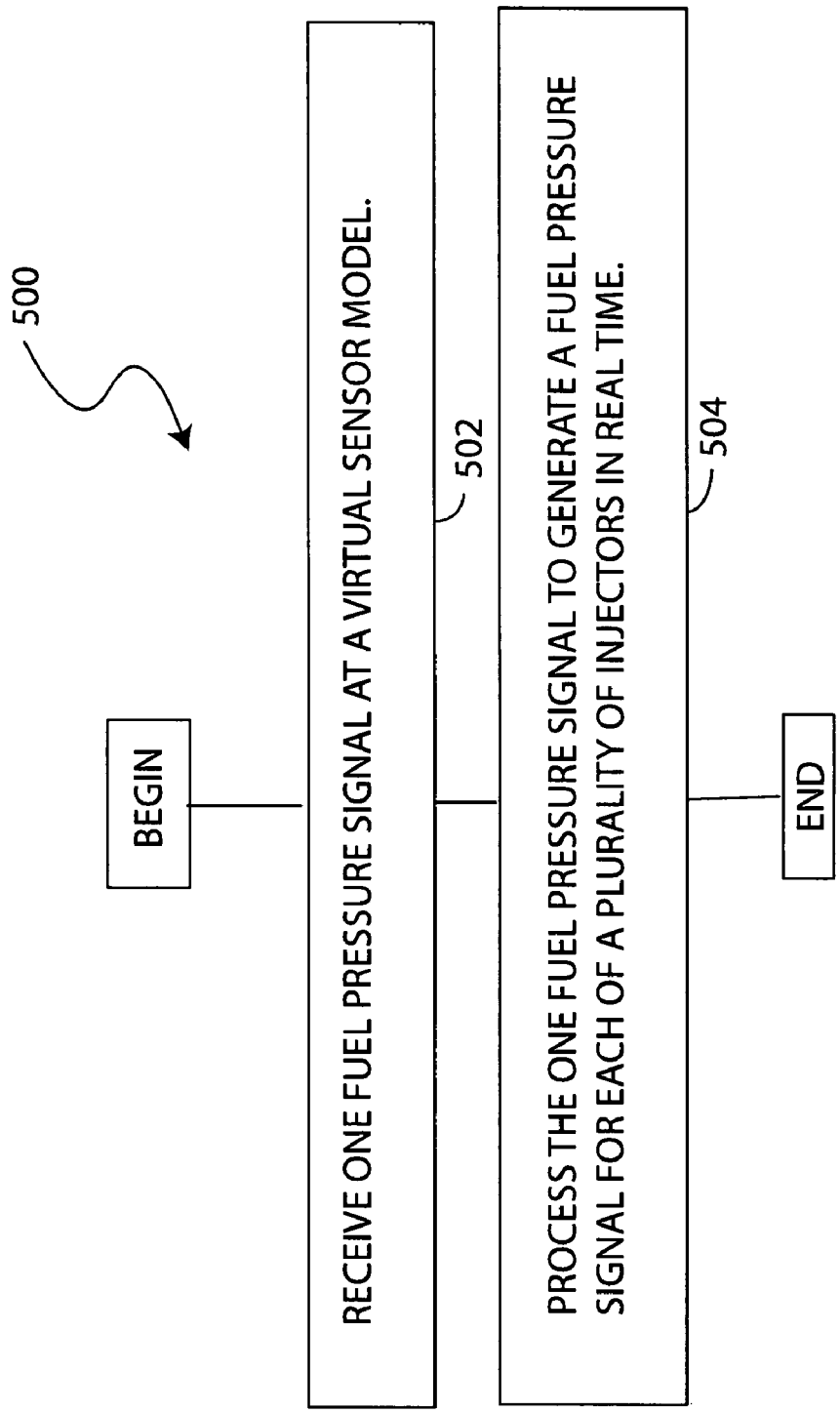
FIG. 5 shows a flow diagram of a method including receiving one fuel pressure signal at a virtual sensor model and processing the one fuel pressure signal to generate a fuel pressure signal for each of a plurality of injectors in real time in accordance with some embodiments.

FIG. 5 shows a flow diagram of a method 500 including receiving one fuel pressure signal at a virtual sensor model (block 502) and processing the one fuel pressure signal to generate a fuel pressure signal for each of a plurality of injectors in real time (block 504). In some embodiments, receiving the one fuel pressure signal at the virtual sensor model includes sampling the fuel pressure signal substantially periodically with respect to engine angle. In some embodiments, the method 500 further includes integrating each of the fuel pressure signals. In some embodiments, the method 500 further includes processing the fuel pressure signal for each of the plurality of injectors to generate an injector pulse width for controlling each of the plurality of injectors. In some embodiments, processing the fuel pressure signal for each of the plurality of injectors to generate an injector pulse width for controlling each of the plurality of injectors, as shown in FIG. 5, includes applying computational fluid dynamics methods in processing the fuel pressure signal.

Figure 6A:
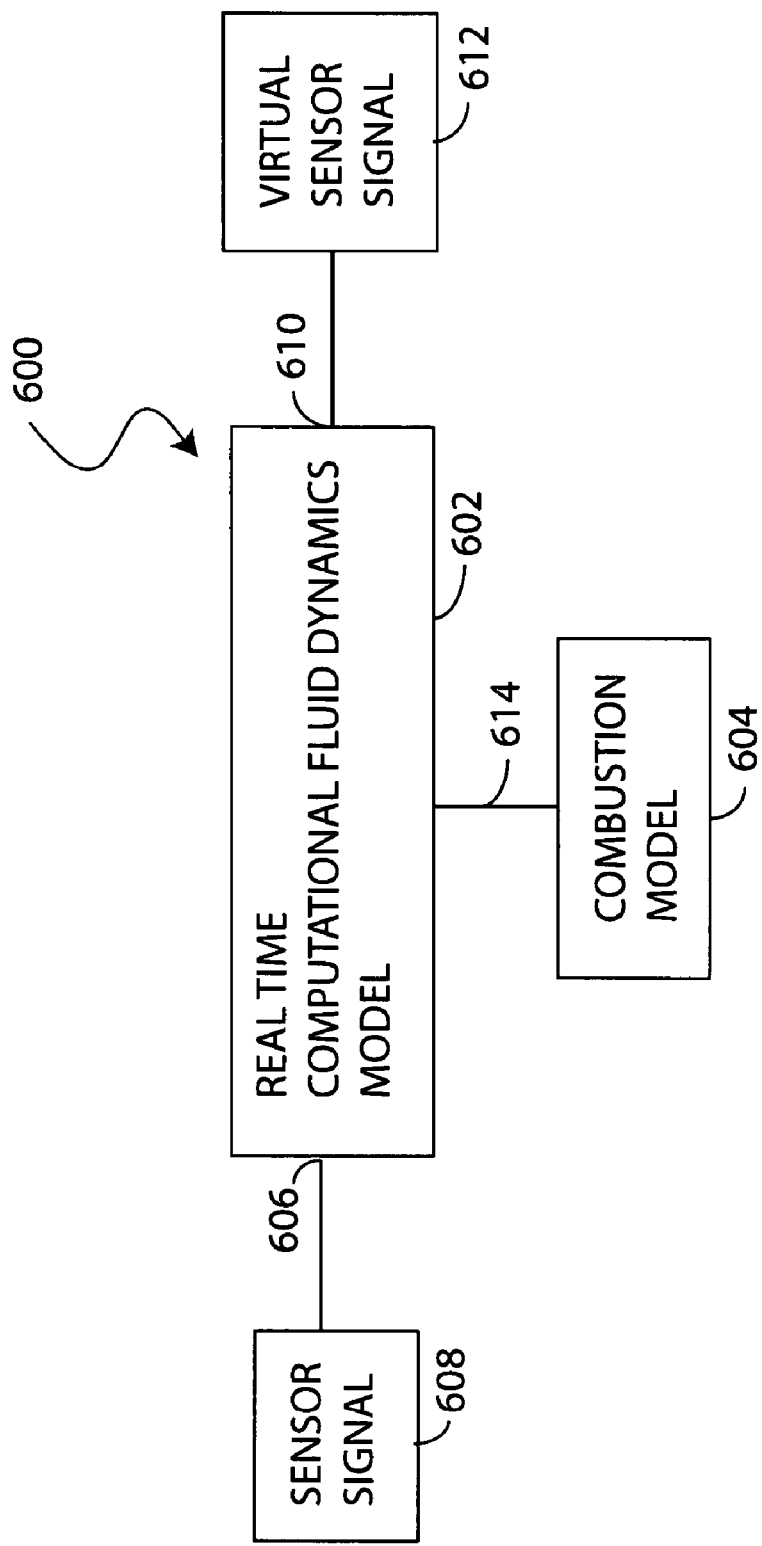
FIG. 6A shows a block diagram of an apparatus including a real time computational fluid dynamics model, and a combustion model to communicate with the real time computational fluid dynamics model in accordance with some embodiments.

FIG. 6A shows a block diagram of an apparatus 600 including a real time computational fluid dynamics model 602 and a combustion model 604 to communicate with the real time computational fluid dynamics model 602 in accordance with some embodiments. The real time computational fluid dynamics model 602 includes an input port 606 to receive a sensor signal 608 and an output port 610 to provide a virtual sensor signal 612. The combustion model 604 communicates combustion information to the real time computational fluid dynamics model 602.

A communication channel 614 provides for communication between the real time computational fluid dynamics model 602 and the combustion model 604. The communication channel 614 includes any method, device, or system for exchanging information. In some embodiments, the information communicated between the real time computational fluid dynamics model 602 and the combustion model 604 is digital information. In some embodiments, the information communicated between the real time computational fluid dynamics model 602 and the combustion model 604 is analog information. The information may be coded or uncoded. Coded information can include fewer bits than the starting information of more bits than the starting information. In a software system, the communication channel 614 includes a variable or a location in a memory shared between the real time computational fluid dynamics model 602 and the combustion model 604.

The real time computational fluid dynamics model 602 predicts the fluid flow and physical properties of the system being modeled. An operating diesel fuel rail in a diesel engine is an exemplary system for modeling in the apparatus 600. In some embodiments, the real time computational fluid dynamics model 602 operates at a frequency of between about 200 hertz and about 1000 kilohertz. Frequencies of between about 200 hertz and about 1000 kilohertz are suitable for modeling a diesel engine fuel rail. In some embodiments, the real time computational fluid dynamics model 602 operates at a frequency slightly greater than required by the Courant number.

The Courant number is substantially equal to the speed of sound divided by a volume element in the computational fluid dynamics model.

The real time computational fluid dynamics model 602, in some embodiments, receives information related to the state of the system being modeled. Exemplary information received, for example by a computational fluid dynamics model for a an engine powered by combustion, includes engine speed, engine load, turbo speed, air/fuel ratio, manifold pressure, and manifold temperature, and exhaust state.

The combustion model 604 simulates chemical reactions in which substances combine with oxygen and release heat energy. In some embodiments, the combustion model 604 includes a model of burning a fuel, such as diesel fuel, in the presence of oxygen to produce heat. The chemical reactions in a combustion process are rapid. Thus, a system to simulate a combustion reaction in real time, includes computing elements and software capable of calculating the necessary physical variables in real time.

In operation, the real time computational fluid dynamics model 602 receives the sensor signal 608 at the input port 606. The combustion model 604 communicates information relating to the combustion process to the real time computational fluid dynamics model 602. The real time computational fluid dynamics model processes the sensor signal 606, such as a pressure signal generated from a pressure sensor in a fuel rail of a diesel engine, and information provided by the combustion model 604 to generate the virtual sensor signal 612 at the output port 610. The virtual sensor signal 612 includes, for example, the pressure value in a diesel fuel rail at a location not monitored by a sensor. The apparatus 600 provides a virtual sensor signal 612, such as a pressure signal, that can be provided to the system being modeled in real time to improve the performance. Performance is improved by reducing undesired gas emissions or using less fuel to produce the same power.

Figure 6B:
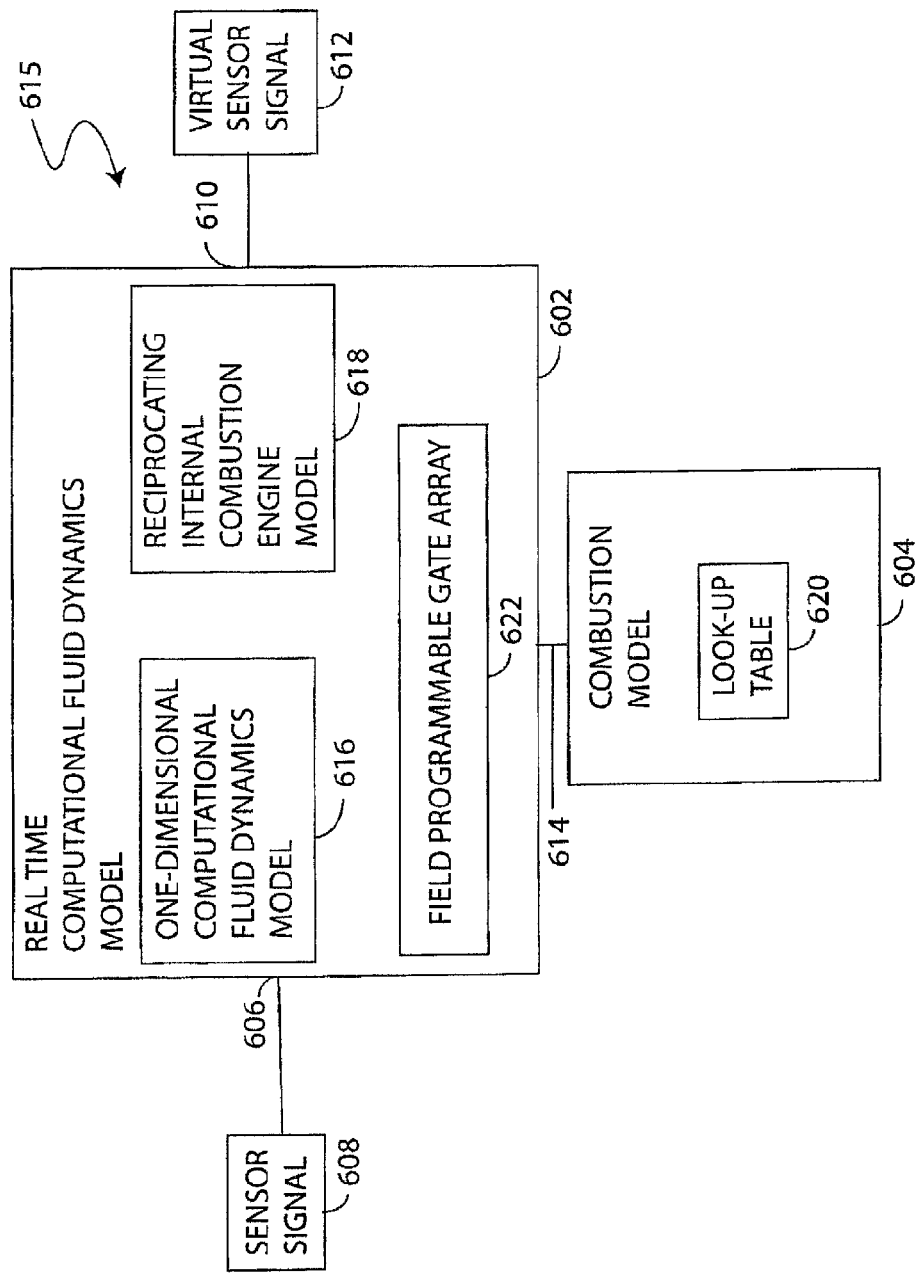
FIG. 6B shows a block diagram of the apparatus shown in FIG. 6A further including a one-dimensional computational fluid dynamics model, a reciprocating internal combustion engine model, a look-up table, and a field programmable gate array in accordance with some embodiments.

FIG. 6B shows a block diagram of an apparatus 614 including the apparatus 600 shown in FIG. 6A and further including a one-dimensional computational fluid dynamics model 616, a reciprocating internal combustion engine model 618, a look-up table 620, and a field programmable gate array 622 in accordance with some embodiments. The apparatus 600 included in the apparatus 614 includes the sensor signal 608, the real time computational fluid dynamics model 602 including the input port 606 and the output port 610, the virtual sensor signal 612, and the combustion model 604.

The one-dimensional computational fluid dynamics model 616, in some embodiments, is included in the real time computational fluid dynamics model 602. The one-dimensional computational fluid dynamics model 616 enables calculation of physical variables in real time. One example of the one-dimensional fluid dynamics model 616 is a pipe. A pipe including a series of computational nodes located along the length of the pipe is one model suitable for modeling a fluid, including liquid and gas fluids, in some engine configurations.

The reciprocating internal combustion engine model 618, in some embodiments, is included in the real time computational fluid dynamics model. The reciprocating internal combustion engine model 618 includes a reciprocating engine model and an internal combustion engine model. A reciprocating engine converts pressure to rotating motion using one or more pistons. A piston is a sliding element that fits within the bore of a cylinder. In an internal combustion engine gases expand to create pressure that causes movement of the piston in the bore of the cylinder. The exothermic reaction of a fuel with an oxidizer causes expansion of the gases in a combustion chamber.

The look-up table 620, in some embodiments, is included in the combustion model 604. The look-up table 620 includes information related the combustion process. For example, in some embodiments, the look-up table 620 includes temperature and pressure at a location in a combustion chamber at discrete points in time during the combustion process. Look-up tables can provide information at a rate that enables real time operation.

The field programmable gate array 622, in some embodiments, is included in the real time computational fluid dynamics model 602. The field programmable gate array 622 includes computation units or nodes including software to calculate the value of physical variables at nodes in the one-dimensional computational fluid dynamics model 616.

In operation, the real time computational fluid dynamics model 602 receives the sensor signal 608 at the input port 606. The combustion model 604 including the look-up table 620 communicates combustion information to the real time computational fluid dynamics model 602 over the communication channel 614. The real time computational fluid dynamics model 602 including the one-dimensional computational fluid dynamics model 616 and the reciprocating internal combustion engine model 618 running in the field programmable gate array 622 provide the virtual sensor signal 612, such as pressure signal, at the output port 610.

Figure 7A:
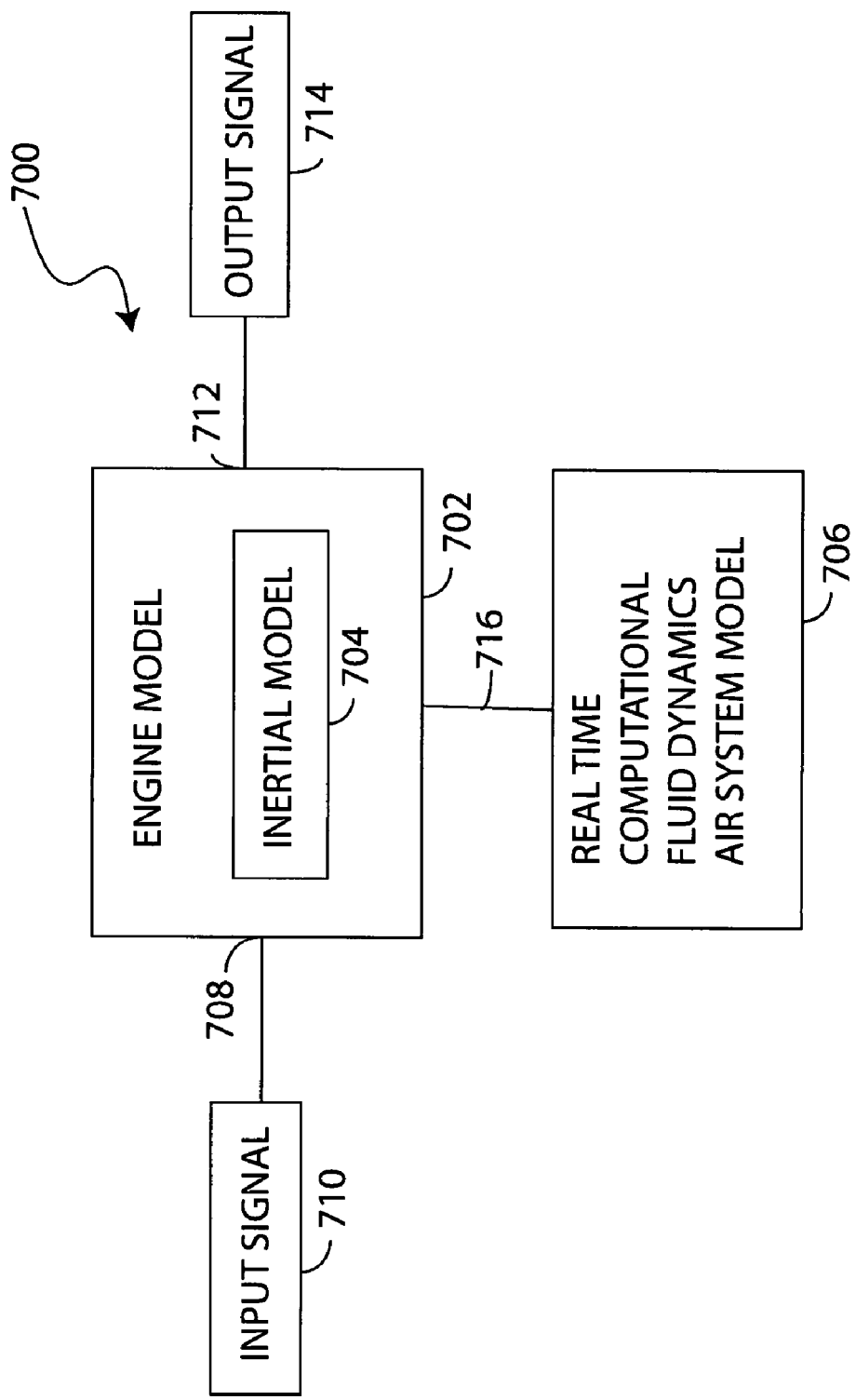
FIG. 7A shows a block diagram of an apparatus including an engine model, an inertial model, and a real time computational fluid dynamics air system model to communicate with the engine model in accordance with some embodiments.

FIG. 7A shows a block diagram of an apparatus 700 including an engine model 702, an inertial model 704, and a real time computational fluid dynamics air system model 706 to communicate with the engine model 702 in accordance with some embodiments. The engine model 702 includes an input port 708 to receive an input signal 710 and an output port 712 to provide an output signal 714.

The real time computational fluid dynamics model 706 communicates with the engine model 702 over a communication channel 716. The communication channel 716 is not limited to a particular type of communication channel. Any system, medium, or method capable of transmitting information between the engine model 702 and the real time computational fluid dynamics air system model 706 is suitable for use in connection with the apparatus 700. In some embodiments, a variable in a software program or a memory location in a computer system is the communication channel 716.

The input signal 710 received at the input port 708 of the engine model 702 includes one or more engine control signals. Exemplary engine control signals include actuator control signals, such as throttle control signals, injector control signals, and spark control signals.

The engine model 702 is not limited to a model of a particular type of engine. Exemplary engines suitable for modeling and use in the apparatus 700 include diesel engines and non-diesel engines. A gasoline engine is an exemplary non-diesel engine suitable for modeling in the apparatus 700. The engine model 702 is suitable for use in connection with a hardware-in-the-loop system. A hardware-in-the-loop system provides a system and method for testing an engine control unit without an actual engine.

The inertial model 704 included in the engine model 702 provides information related to the dynamic operation of the engine being modeled. For example, in some embodiments, the inertial model includes a torque model that provides information related to the amount of force required to rotate the crankshaft of an engine. In some embodiments, the inertial model 704 includes an engine speed model that provides information related to the rotation rate of the engine.

The real time computational fluid dynamics air system model 706 includes a computational fluid dynamics model of the air system included in the engine model 702. In some embodiments, the real time computational fluid dynamics, air system model 706 is a one-dimensional model. Exemplary elements that may be included in the real time computational fluid dynamics air system model 706 include an intake model and an exhaust model for the engine being modeled. In some embodiments, the real time computational fluid dynamics air system model 706 includes a catalytic converter model and an turbocharger model. In some embodiments, a virtual sensor signal is generated for information that cannot be obtained using a sensor. For example, the ratio of exhaust gas recirculation/mass of fresh air in a diesel engine can be provided through the real time computational fluid dynamics air system model 706. Other virtual quantities that can be provided include the pressure difference across a turbo and charge air quality.

In operation, the engine model 702 receives the input signal 710 at the input port 708. The input signal 710 includes one or more engine control signals, such as engine actuator signals. The real time computational fluid dynamics air system model 706 performs a real time computation for variables included in the engine air system and communicates the results to the engine model 702. After processing the information received from the real time computational fluid dynamics air system model 706 and the engine control signals, provided at the input port 708, the engine model 702 provides the output signal 714, including one or more engine signals such as engine speed, at the output port 712.

Figure 7B:
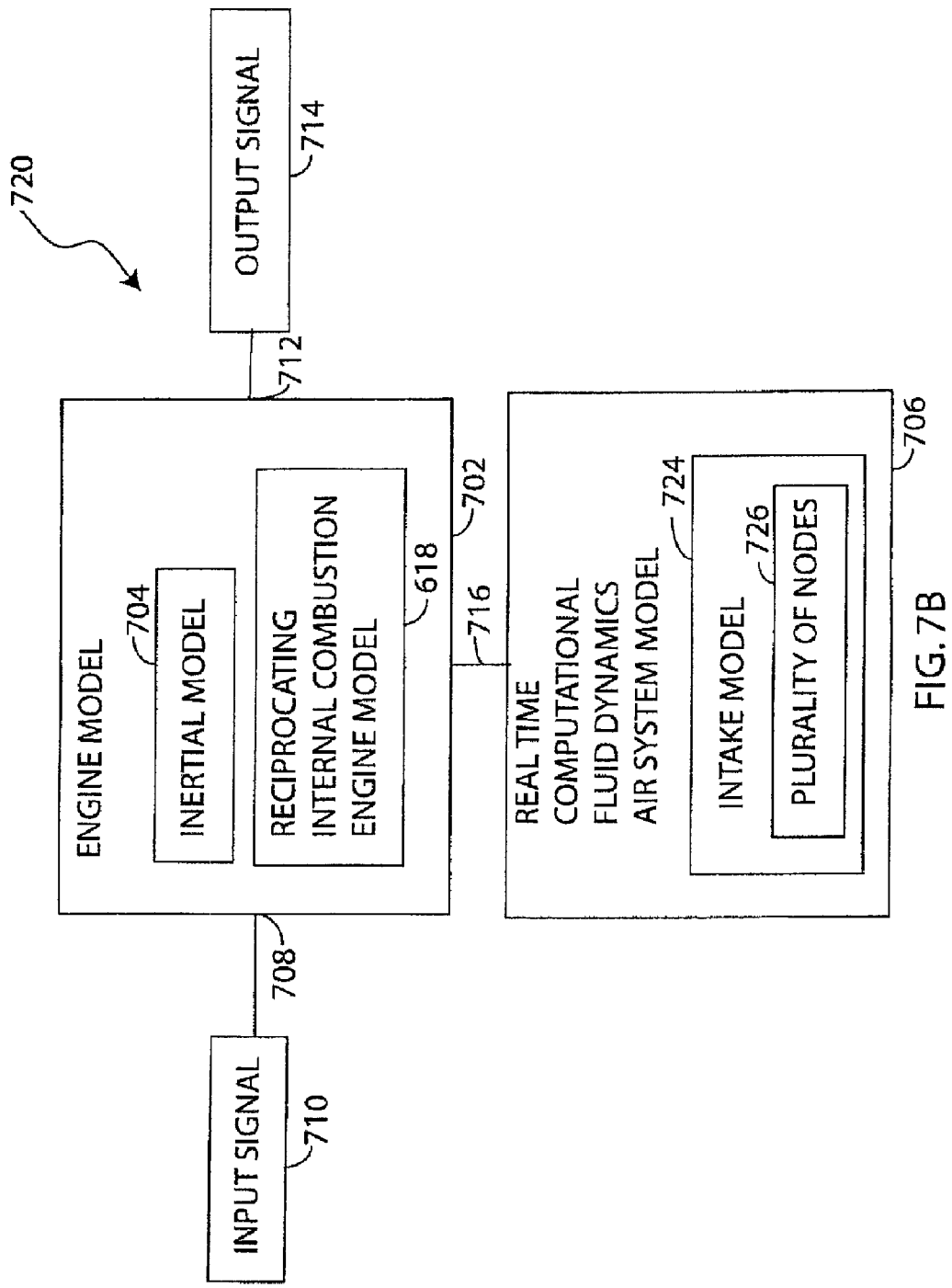
FIG. 7B shows a block diagram of an apparatus including the apparatus show in FIG. 7A and further including a reciprocating internal combustion engine model, an intake model, and a plurality of nodes included in the intake model in accordance with some embodiments.

FIG. 7B shows a block diagram of an apparatus 720 including the apparatus 700, show in FIG. 7A, and further including a reciprocating internal combustion engine model 618 included in the engine model 702, an intake model 724 included in the real time computational fluid dynamics model 706, and a plurality of nodes 726 included in the intake model 724 in accordance with some embodiments. The reciprocating internal combustion engine model 618 includes the reciprocating engine model and the internal combustion engine model described above. The intake model 724 includes the plurality of nodes 726 to model the intake system of the engine being modeled. Each node in the plurality of nodes 726 includes a computation unit that includes software and hardware to compute a computational fluid dynamics variable at a node location in the intake model 724.

In operation, the engine model 702 receives the input signal 710 at the input port 708 and a communication from the real time computational fluid dynamics air system model 706 via the communication channel 716. The communication includes information, such as virtual sensor signals, relating to the output of the intake model 724 generated by the plurality of nodes 726. The engine model 702 processes information from the inertial model 704, the reciprocating internal combustion engine model 618, and the received information to generate the output signal 714 at the output port 712.

Figure 7C:
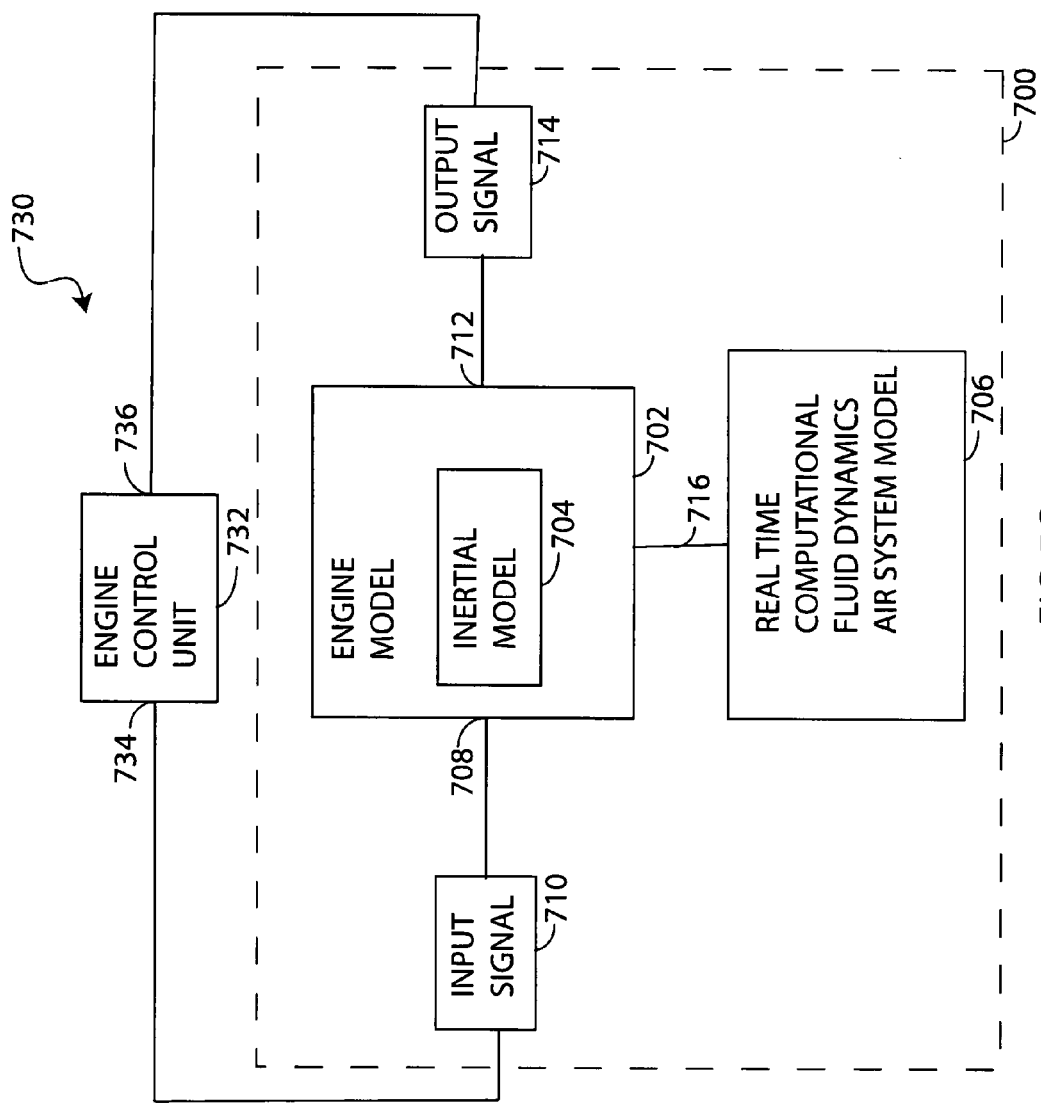
FIG. 7C shows a block diagram of an apparatus including the apparatus show in FIG. 7A coupled to an engine control unit in accordance with some embodiments.

FIG. 7C shows a block diagram of an apparatus 730 including the apparatus 700, shown in FIG. 7A, coupled to an engine control unit 732 in accordance with some embodiments. The engine control unit 732 includes an output port to provide the input signal 710 to the engine model 702. The engine control unit 732 includes an input port 736 to receive the output signal 714 from the engine model 702. The apparatus 730 is sometimes referred to as a hardware-in-the-loop system and enables testing of the engine control unit 732. In operation, the engine model 702 receives, at the input port 708, the input signal 710, such as an actuator signal, from the engine control unit 732, receives via the communication channel 716 information, such a pressure or temperature information related to the air system, from the real time computational fluid dynamics air system model 706, and provides the output signal 714, such as a virtual pressure signal, to the engine control unit 732, at the output port 712.

Figure 7D:
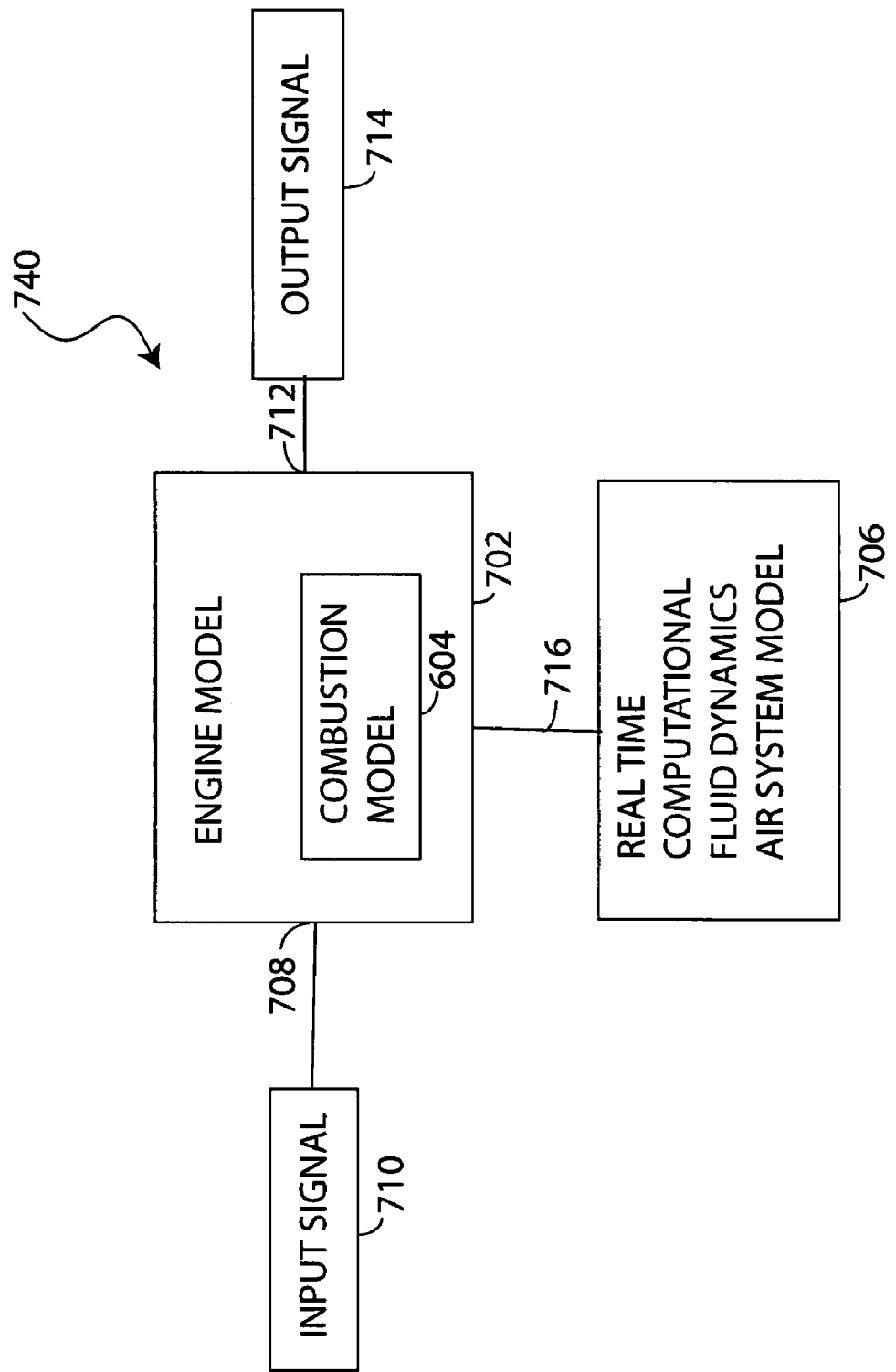
FIG. 7D shows a block diagram of an apparatus including an engine model, a combustion model, and a real time computational fluid dynamics air system model to communicate with the engine model in accordance with some embodiments.

FIG. 7D shows a block diagram of an apparatus 740 including an engine model 702, a combustion model 604 included in the engine model 702, and a real time computational fluid dynamics air system model 706 to communicate with the engine model 702 in accordance with some embodiments. The apparatus 740 includes all the elements of the apparatus 700, shown in FIG. 7A and described above, except the inertial model 740. Further, the apparatus 740 includes the combustion model 604 not explicitly included in the apparatus 700 shown in FIG. 7A.

The combustion model 604 simulates chemical reactions in which substances combine with oxygen and release heat energy. In some embodiments, the combustion model 604 includes a model of burning a fuel, such as diesel fuel, in the presence of oxygen to produce heat. The chemical reactions in a combustion process are rapid. Thus, a system to simulate a combustion reaction in real time, includes computing elements and software capable of calculating the physical variables in real time.

In operation, the engine model 702 receives the input signal 710 at the input port 708. The input signal 710 includes one or more engine control signals, such as engine actuator signals. The real time computational fluid dynamics air system model 706 performs a real time computation for variables included in the engine air system and communicates the results to the engine model 702 via the communication channel 716. After processing the information received from the real time computational fluid dynamics air system model 706 and the input signal 710, the engine model 702 provides the output signal 714, including one or more engine signals such as engine speed, at the output port 712.

Figure 7E:
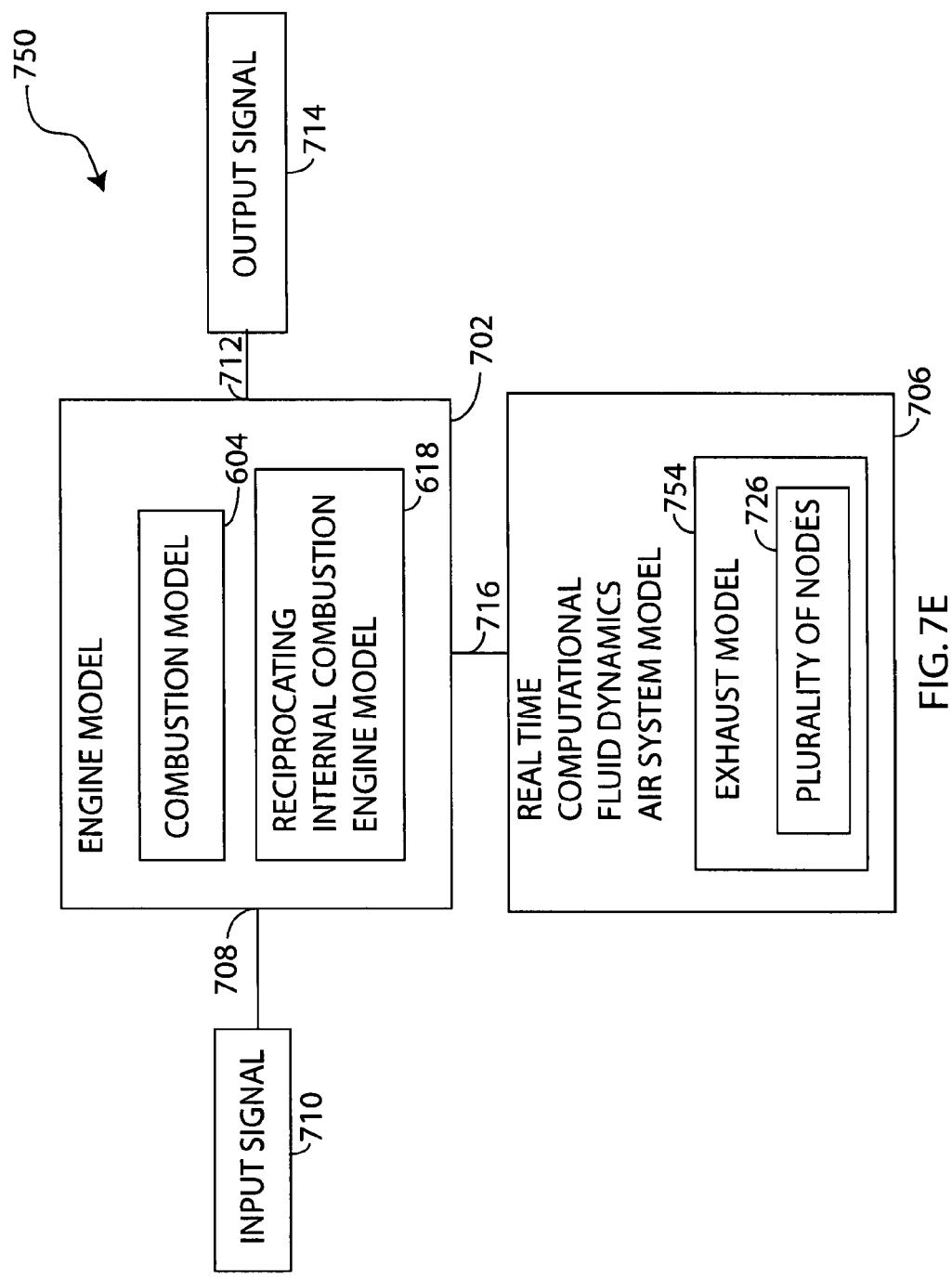
FIG. 7E shows a block diagram of an apparatus including the apparatus show in FIG. 7D and further including a reciprocating internal combustion engine model, an exhaust model, and a plurality of nodes included in the exhaust model in accordance with some embodiments.

FIG. 7E shows a block diagram of an apparatus 750 including the apparatus 740 show in FIG. 7D and further including a reciprocating internal combustion engine model 618 included in the engine model 702, an exhaust model 754 included in the real time computational fluid dynamics model 706, and a plurality of nodes 726 included in the exhaust model 754 in accordance with some embodiments. The reciprocating internal combustion engine model 618 is described above and includes the reciprocating engine model and the internal combustion engine model described above. The exhaust model 754 includes the plurality of nodes 726 to model the intake system of the engine being modeled. Each node in the plurality of nodes 726 includes a computation unit that includes software and hardware to compute a computational fluid dynamics variable at a node location in the exhaust model 754.

In operation, the engine model 702 receives the input signal 710 at the input port 708, and information generated by the exhaust model 754 via the plurality of nodes 726 from the real time computational fluid dynamics air system model 706 via the communication channel 716. The engine model 702 process the combustion model 694 information, the reciprocating internal combustion engine model 618 information, and the received information to generate the output signal 714 at the output port 712.

Figure 7F:
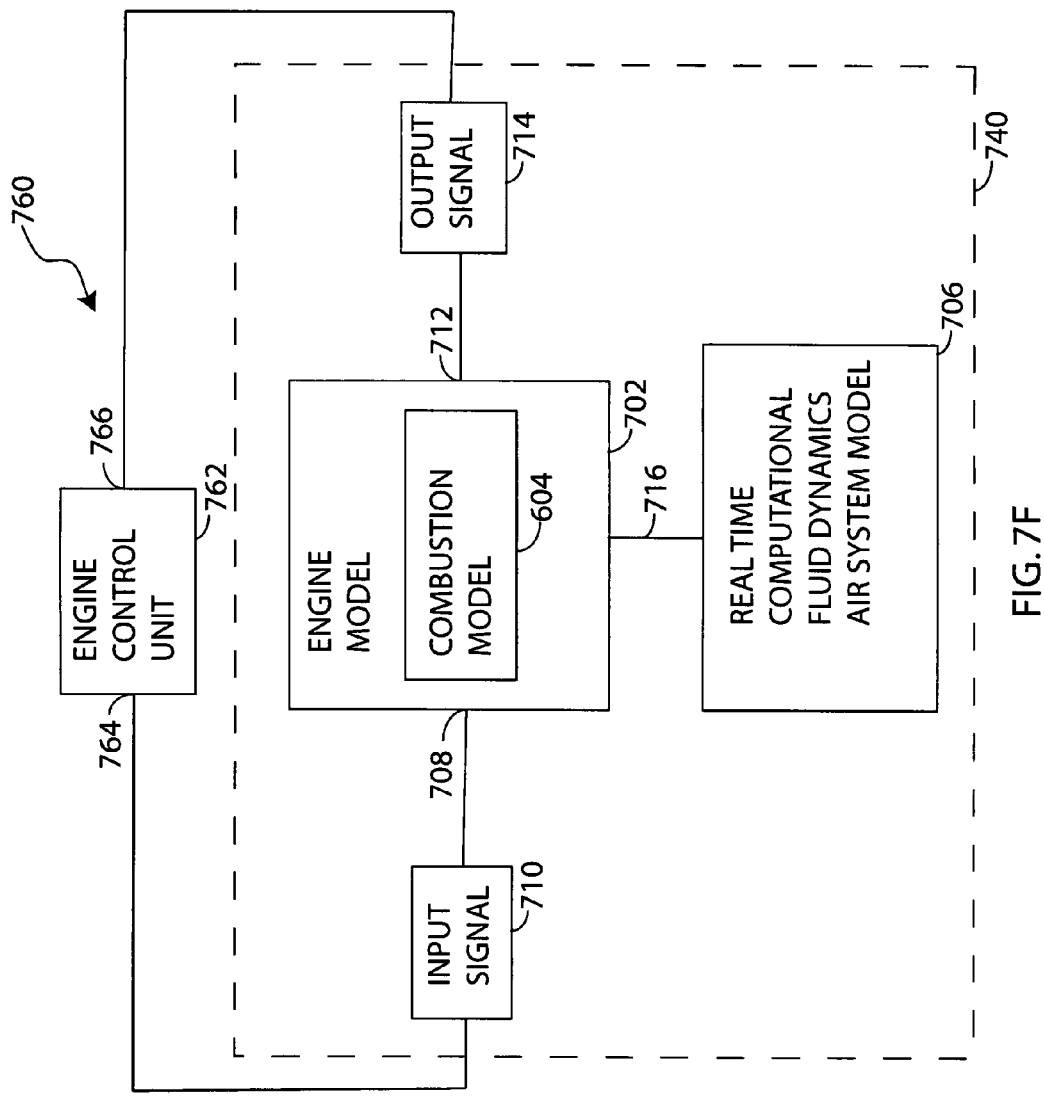
FIG. 7F shows a block diagram of an apparatus including the apparatus shown in FIG. 7D coupled to an engine control unit in accordance with some embodiments.

FIG. 7F shows a block diagram of an apparatus 760 including the apparatus 740 show in FIG. 7D, coupled to an engine control unit 762 in accordance with some embodiments. The engine control unit 762 includes an output port 764 and an input port 766. The output port 764 of the engine control unit is coupled to the input port 708 of the engine model 702. The output port 712 of the engine model 702 is coupled to the input port 766 of the engine control unit. The apparatus 760 is sometimes referred to as a hardware-in-the-loop system and enables testing of the engine control unit 732 without an actual engine.

In operation, the engine control unit 762 provides the input signal 710, such as an actuator signal, to the engine model 702. The engine control unit 762 provides the input signal 710 at the output port 764. The engine model 702 receives the input signal 710 at the input port 708. The engine control unit 762 receives the output signal 714 from the engine model 702. The engine model 702 provides the output signal 714 at the output port 712. The engine control unit 762 receives the output signal 714 at the input port 766.

The engine model 702 receives the input signal 710 at the input port 708. The input signal 710 includes one or more engine control signals, such as engine actuator signals. The real time computational fluid dynamics air system model 706 performs a real time computation for variables included in the engine air system and communicates the results to the engine model 702 via the communication channel 716. After processing the information received from the real time computational fluid dynamics air system model 706, the combustion model 604, and the input signal 710, the engine model 702 provides the output signal 714, including one or more engine signals such as engine speed, at the output port 712.

Figure 8:
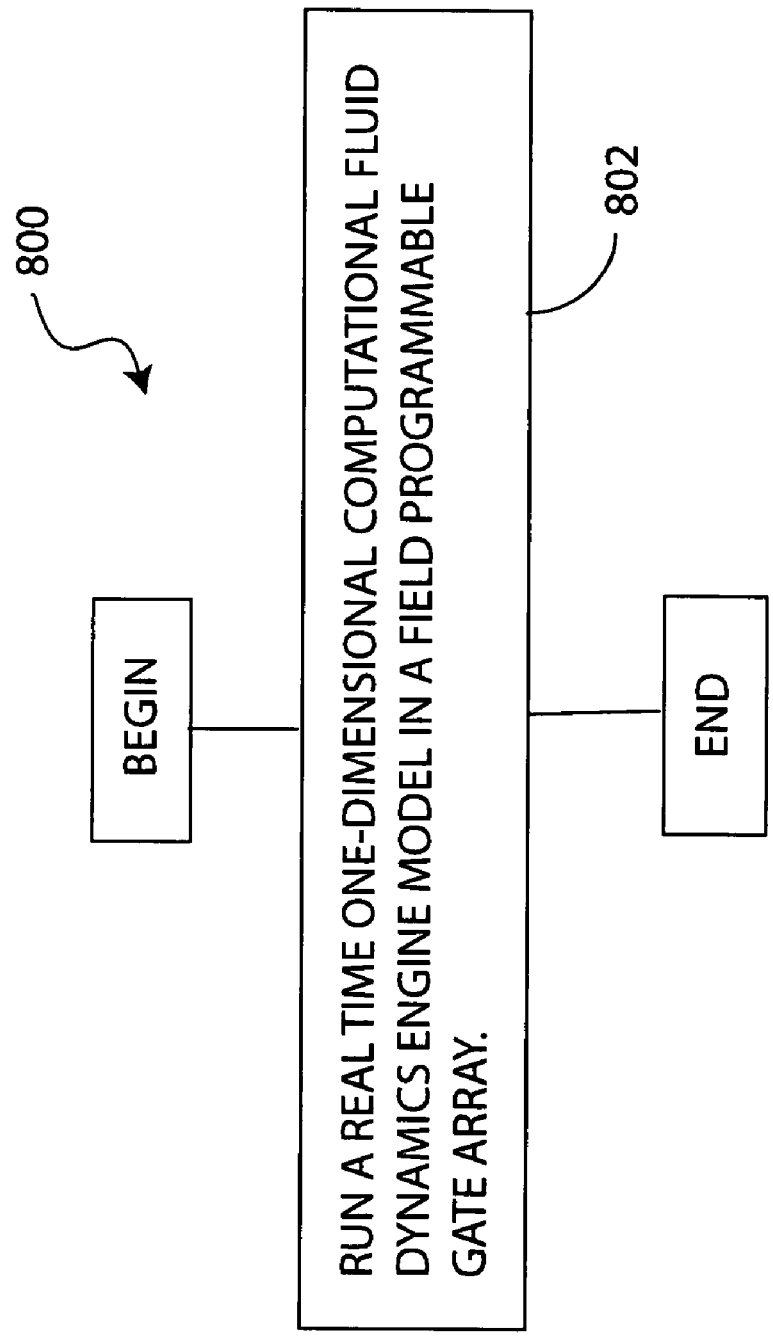
FIG. 8 shows a flow diagram of a method including running a real time one-dimensional computational fluid dynamics engine model in a field programmable gate array in accordance with some embodiments.

FIG. 8 shows a flow diagram of a method 800 including running a real time one-dimensional computational fluid dynamics engine model in a field programmable gate array (block 802). In some embodiments, the field programmable gate array is replaced by an application specific integrated circuit. Generally, an application specific integrated circuit replaces the field programmable gate array when production quantities of the model are required, such as when the model is included in a production vehicle, such as a passenger car or industrial truck. A field programmable gate array is converted to an application specific integrated circuit by removing some of the programmable features of the field programmable gate array. The method 800 is useful in systems that simulate the engine being modeled. A simulation system that includes the method 800 can be configured to provide simulated actual sensor signals and virtual sensor signals. Such a simulation system is useful for applications such as testing an engine control unit when the engine is unavailable.

In some embodiments, the method 800, further includes configuring a hardware-in-the-loop test system including an engine control unit coupled to the real time one-dimensional computational fluid dynamics engine model in the field programmable gate array. In operation, an engine control unit provides engine control signals to an engine, such as a diesel engine. A hardware-in-the-loop test system enables testing an engine control unit when an actual engine is unavailable for testing, such as in the early design phases of a new engine or when the cost of providing an actual engine is high. The engine is replaced by the real time one-dimensional computational fluid dynamics engine model in the field programmable gate array and perhaps other models, such as combustion and inertia/torque models.

In some embodiments, the method 800 further includes testing the engine control unit by sending signals to the real time one-dimensional computational fluid dynamics engine model running in the field programmable gate array and receiving signals from the real time one-dimensional computational fluid dynamics engine model running in the field programmable gate array.

Figure 9:
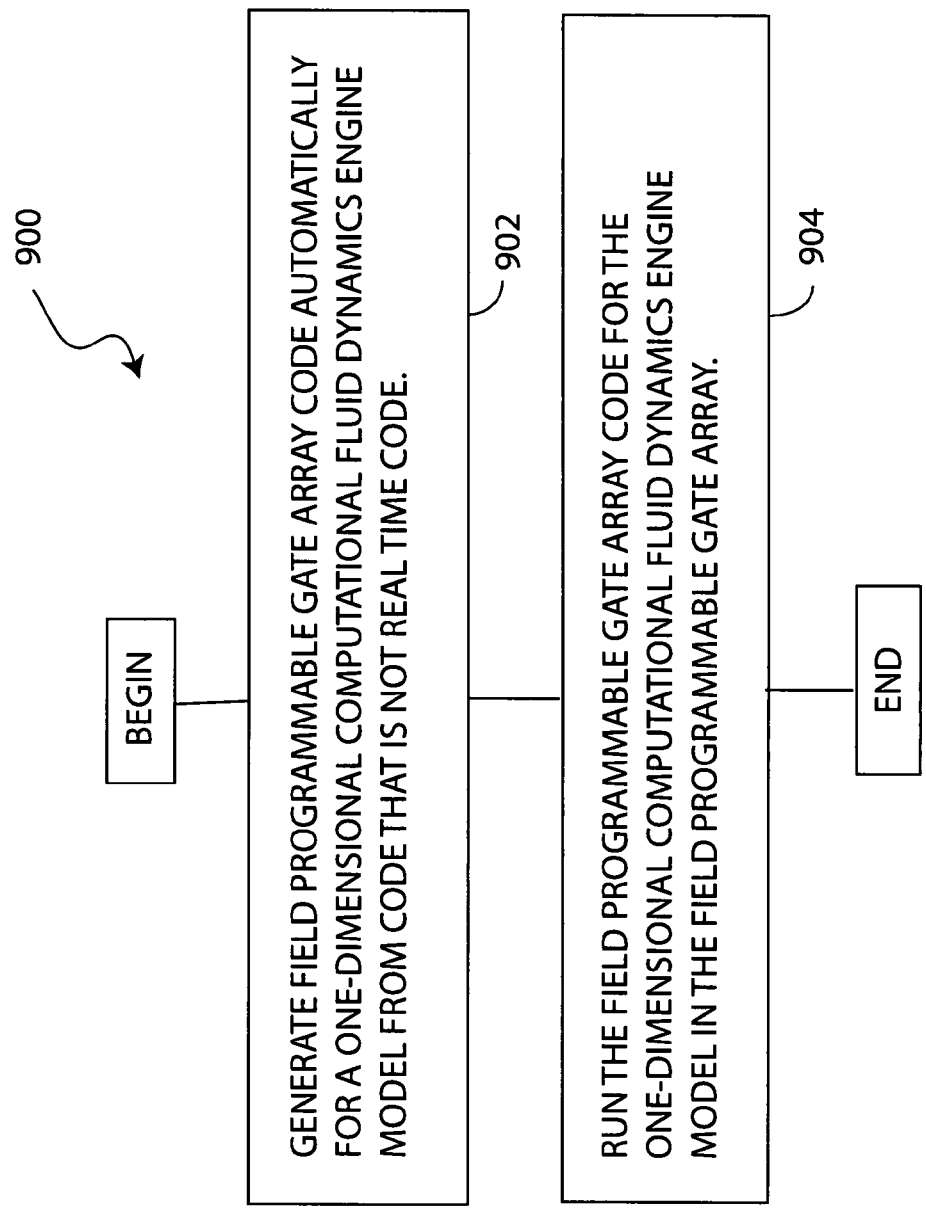
FIG. 9 shows a flow diagram of a method including generating field programmable gate array code automatically for a one-dimensional computational fluid dynamics engine model from code that is not real time code, and running the field programmable gate array code for the one-dimensional computational fluid dynamics engine model in the field programmable gate array in accordance with some embodiments.

FIG. 9 shows a flow diagram of a method 900 including generating field programmable gate array code automatically for a one-dimensional computational fluid dynamics engine model from code that is not real time code (block 902), and running the field programmable gate array code for the one-dimensional computational fluid dynamics engine model in the field programmable gate array (block 904). Code can be generated automatically by converting a non-real time simulation model into real time simulation model that can run on a field programmable gate array.

In some embodiments, the method 900 further includes testing an engine control unit by sending signals to the real time one-dimensional computational fluid dynamics engine model running in the field programmable gate array and receiving signals from the real time one-dimensional computational fluid dynamics engine model running in the field programmable gate array. Exemplary signals provided by the engine control unit include throttle command, turbo boost command, spark commands, and injector commands. These are processed by the model running on the field programmable gate array to produce sensor values, such as throttle position, manifold pressure, manifold temperature, engine speed, and coolant temperature, that are provided to the engine control unit.

The disclosed embodiments have been provided to illustrate various features of the disclosure. Persons skilled in the art of computational fluid dynamics, having the benefit of this disclosure, will recognize variations and modifications of the disclosed embodiments, which none the less fall within the spirit and scope of the appended claims.

We claim:

1. An apparatus comprising:
a diesel engine including a sensor; and
an engine control unit coupled to the diesel engine and including a virtual sensor model to receive a sensor signal from the sensor and to perform a real time computational fluid dynamics calculation to generate a virtual sensor signal for use in forming a real time engine control signal to control the diesel engine;
wherein the diesel engine includes an injector and the virtual sensor signal is integrated to form the real time engine control signal for the injector; and
wherein the sensor signal is received at a time t1, wherein the real time engine control signal is formed at a time t2, and wherein the difference between time t2 and time t1 is between ten microseconds and ten milliseconds.

2. The apparatus of claim 1, wherein the virtual sensor model includes a field programmable gate array.

3. The apparatus of claim 1, wherein the diesel engine and the engine control unit are included in a vehicle.

4. The apparatus of claim 1, wherein the sensor signal is received by the virtual sensor model substantially periodically with respect to an engine angle of the diesel engine.

5. The apparatus of claim 1, wherein the sensor is a fuel pressure sensor.

6. The apparatus of claim 1, wherein said processing includes using a computational fluid dynamics model to generate the virtual signal in real time.

7. The apparatus of claim 6, wherein the computational fluid dynamics model includes a model of a diesel fuel rail.

8. A method, comprising:
receiving a sensor signal from a sensor of a diesel engine; and
processing the sensor signal using real time computational fluid dynamics methods to generate a virtual sensor signal in real time;
wherein the diesel engine includes an injector and the virtual sensor signal is integrated to form the real time engine control signal for the injector; and wherein the sensor signal is received at a time t1, wherein the real time engine control signal is formed at a time t2, and wherein the difference between time t2 and time t1 is between ten microseconds and ten milliseconds.

9. The method of claim 8, wherein said processing includes interpolation.

10. The method of claim 8, further comprising processing the virtual sensor signal to generate a real time engine control signal to control the diesel engine.

11. The method of claim 8, wherein diesel engine includes a plurality of injectors and wherein the real time engine control signal controls one or more of the plurality of injectors.

12. The method of claim 8, wherein the sensor is a fuel pressure sensor.

13. The method of claim 8, wherein the virtual sensor model includes a field programmable gate array.

14. The method of claim 8, wherein said processing includes using a computational fluid dynamics model to generate the virtual signal in real time.

15. The method of claim 14, wherein the computational fluid dynamics model includes a model of a diesel fuel rail.

16. An apparatus comprising:
a diesel engine including a sensor; and
an engine control unit coupled to the diesel engine and including a virtual sensor model to receive a sensor signal from the sensor and to perform a real time computational fluid dynamics calculation to generate a virtual sensor signal for use in forming a real time engine control signal to control the diesel engine;
wherein the virtual sensor model includes a field programmable gate array.

17. The apparatus of claim 16, wherein the diesel engine includes an injector and the virtual sensor signal is integrated to form the real time engine control signal for the injector.

18. The apparatus of claim 16, wherein the diesel engine and the engine control unit are included in a vehicle.

19. The apparatus of claim 16, wherein the sensor signal is received by the virtual sensor model substantially periodically with respect to an engine angle of the diesel engine.

20. The apparatus of claim 16, wherein the sensor is a fuel pressure sensor.

21. The apparatus of claim 16, wherein said processing includes using a computational fluid dynamics model to generate the virtual signal in real time.

22. The apparatus of claim 21, wherein the computational fluid dynamics model includes a model of a diesel fuel rail.

23. A method, comprising:
receiving a sensor signal from a sensor of a diesel engine; and
processing the sensor signal using real time computational fluid dynamics methods to generate a virtual sensor signal in real time;
wherein the virtual sensor model includes a field programmable gate array.

24. The method of claim 23, wherein said processing includes interpolation.

25. The method of claim 23 further comprising processing the virtual sensor signal to generate a real time engine control signal to control the diesel engine.

26. The method of claim 23, wherein diesel engine includes a plurality of injectors and wherein the real time engine control signal controls one or more of the plurality of injectors.

27. The method of claim 23, wherein the sensor is a fuel pressure sensor.

28. The method of claim 23, wherein said processing includes using a computational fluid dynamics model to generate the virtual signal in real time.

29. The method of claim 28, wherein the computational fluid dynamics model includes a model of a diesel fuel rail.

30. An apparatus comprising:
a diesel engine including a sensor; and
an engine control unit coupled to the diesel engine and including a virtual sensor model to receive a sensor signal from the sensor and to perform a real time computational fluid dynamics calculation to generate a virtual sensor signal for use in forming a real time engine control signal to control the diesel engine;
wherein the sensor is a fuel pressure sensor.

31. The apparatus of claim 30, wherein the diesel engine and the engine control unit are included in a vehicle.

32. The apparatus of claim 30, wherein the sensor signal is received by the virtual sensor model substantially periodically with respect to an engine angle of the diesel engine.

33. The apparatus of claim 30, wherein said processing includes using a computational fluid dynamics model to generate the virtual signal in real time.

34. The apparatus of claim 33, wherein the computational fluid dynamics model includes a model of a diesel fuel rail.

35. A method, comprising:
receiving a sensor signal from a sensor of a diesel engine; and
processing the sensor signal using real time computational fluid dynamics methods to generate a virtual sensor signal in real time;
wherein the sensor is a fuel pressure sensor.

36. The method of claim 35, wherein said processing includes interpolation.

37. The method of claim 35, further comprising processing the virtual sensor signal to generate a real time engine control signal to control the diesel engine.

38. The method of claim 35, wherein diesel engine includes a plurality of injectors and wherein the real time engine control signal controls one or more of the plurality of injectors.

39. The method of claim 35, wherein said processing includes using a computational fluid dynamics model to generate the virtual signal in real time.

40. The method of claim 39, wherein the computational fluid dynamics model includes a model of a diesel fuel rail.

41. An apparatus comprising:
a diesel engine including a sensor; and
an engine control unit coupled to the diesel engine and including a virtual sensor model to receive a sensor signal from the sensor and to perform a real time computational fluid dynamics calculation to generate a virtual sensor signal for use in forming a real time engine control signal to control the diesel engine;
wherein said processing includes using a computational fluid dynamics model to generate the virtual signal in real time, and wherein the computational fluid dynamics model includes a model of a diesel fuel rail.

42. The apparatus of claim 41, wherein the diesel engine includes an injector and the virtual sensor signal is integrated to form the real time engine control signal for the injector.

43. The apparatus of claim 41, wherein the diesel engine and the engine control unit are included in a vehicle.

44. The apparatus of claim 41, wherein the sensor signal is received by the virtual sensor model substantially periodically with respect to an engine angle of the diesel engine.

45. A method, comprising:
receiving a sensor signal from a sensor of a diesel engine; and
processing the sensor signal using real time computational fluid dynamics methods to generate a virtual sensor signal in real time;
wherein said processing includes using a computational fluid dynamics model to generate the virtual signal in real time, and wherein the computational fluid dynamics model includes a model of a diesel fuel rail.

46. The method of claim 45, wherein said processing includes interpolation.

47. The method of claim 45, further comprising processing the virtual sensor signal to generate a real time engine control signal to control the diesel engine.

48. The method of claim 45, wherein diesel engine includes a plurality of injectors and wherein the real time engine control signal controls one or more of the plurality of injectors.

* * * * *